United States Patent
Asaka

(10) Patent No.: US 10,850,769 B2
(45) Date of Patent: Dec. 1, 2020

(54) DETECTING APPARATUS AND ELECTRIC POWER STEERING APPARATUS

(71) Applicant: NSK LTD., Tokyo (JP)

(72) Inventor: Atsuyoshi Asaka, Maebashi (JP)

(73) Assignee: NSK LTD., Tokyo (JP)

( * ) Notice: Subject to any disclaimer, the term of this patent is extended or adjusted under 35 U.S.C. 154(b) by 76 days.

(21) Appl. No.: 16/303,228

(22) PCT Filed: Jul. 4, 2017

(86) PCT No.: PCT/JP2017/024470
§ 371 (c)(1),
(2) Date: Nov. 20, 2018

(87) PCT Pub. No.: WO2018/008628
PCT Pub. Date: Jan. 11, 2018

(65) Prior Publication Data
US 2020/0180689 A1    Jun. 11, 2020

(30) Foreign Application Priority Data

Jul. 5, 2016  (JP) .................................. 2016-133649
Nov. 7, 2016  (JP) .................................. 2016-217299

(51) Int. Cl.
*B62D 6/10*   (2006.01)
*B62D 5/04*   (2006.01)
(Continued)

(52) U.S. Cl.
CPC ............... *B62D 6/10* (2013.01); *B62D 5/049* (2013.01); *B62D 15/0215* (2013.01); *G01D 5/04* (2013.01); *G01L 3/104* (2013.01); *B62D 5/0463* (2013.01)

(58) Field of Classification Search
CPC ...... B62D 6/10; B62D 5/049; B62D 15/0215; G01D 5/04; G01L 3/104
(Continued)

(56) References Cited

U.S. PATENT DOCUMENTS

2003/0179004 A1*  9/2003  Fukusumi ............ G01R 31/006
                                                     324/713
2011/0035114 A1*  2/2011  Yoneda .................... H02P 6/185
                                                     701/42
(Continued)

FOREIGN PATENT DOCUMENTS

JP    2005051839 A    2/2005
JP    2005231476 A    9/2005
(Continued)

OTHER PUBLICATIONS

Notice of Allowance for Japanese Application JP2018-526390 dated Aug. 8, 2018.
(Continued)

*Primary Examiner* — Peter D Nolan
*Assistant Examiner* — Luat T Huynh
(74) *Attorney, Agent, or Firm* — Sughrue Mion, PLLC

(57) ABSTRACT

A detecting apparatus that uses a redundancy configuration comprising plural sensor sections including plural detecting sections, accurately performs abnormality detection and function continuation in a control apparatus such as an ECU in a case that abnormality is occurred in the sensor sections or a signal line, and has simple manufacturing processes, and an electric power steering apparatus equipped with the detecting apparatus. The apparatus includes plural sensor sections which include plural detecting sections that detect a same object or a same state quantity, and detects at least one of the state quantities in at least two of the sensor sections, wherein each of the sensor sections has a commu-
(Continued)

nication section that outputs the state quantities, which the detecting sections detect, as an error detectable signal.

6 Claims, 24 Drawing Sheets

(51) Int. Cl.
*B62D 15/02* (2006.01)
*G01D 5/04* (2006.01)
*G01L 3/10* (2006.01)

(58) Field of Classification Search
USPC .......................................................... 701/41
See application file for complete search history.

(56) References Cited

U.S. PATENT DOCUMENTS

| | | | |
|---|---|---|---|
| 2012/0312627 A1* | 12/2012 | Morishita | B62D 5/0463 180/446 |
| 2014/0088831 A1 | 3/2014 | Hisazumi et al. | |
| 2015/0317284 A1 | 11/2015 | Takahashi | |
| 2016/0288824 A1* | 10/2016 | Mose | B62D 5/0463 |
| 2016/0339945 A1* | 11/2016 | Kozawa | G01L 25/003 |
| 2016/0339946 A1* | 11/2016 | Kuramitsu | B62D 5/0421 |

FOREIGN PATENT DOCUMENTS

| | | |
|---|---|---|
| JP | 2013-253806 A | 12/2013 |
| JP | 2014-234101 A | 12/2014 |
| JP | 2015-046770 A | 3/2015 |
| JP | 5688691 B2 | 3/2015 |
| JP | 5942613 B2 | 6/2016 |
| JP | 5974997 B2 | 8/2016 |
| JP | 6061117 B2 | 1/2017 |
| JP | 6098513 B2 | 3/2017 |
| JP | 6136595 B2 | 5/2017 |
| JP | 6344307 B2 | 6/2018 |
| JP | 6361589 B2 | 7/2018 |
| WO | 2016/042607 A1 | 3/2016 |

OTHER PUBLICATIONS

International Search Report for PCT/JP2017/024470 dated Aug. 1, 2017 [PCT/ISA/210].

* cited by examiner

PRIOR ART

NO INPUT TORQUE
( RELATIVE ANGLE IS ZERO )

INPUT TORQUE IS MAXIMUM
( RELATIVE ANGLE IS MAXIMUM )

DETECTING APPARATUS AND ELECTRIC POWER STEERING APPARATUS

CROSS REFERENCE TO RELATED APPLICATIONS

This application is a National Stage of International Application No. PCT/JP2017/024470 filed Jul. 4, 2017, claiming priority based on Japanese Patent Application Nos. 2016-133649 filed Jul. 5, 2016 and 2016-217299 filed Nov. 7, 2016.

TECHNICAL FIELD

The present invention relates to a detecting apparatus that detects a torque, a rotational angle and the like, an electric power steering apparatus equipped with the detecting apparatus, and the electric power steering apparatus equipped with a detector to detect the torque, the rotational angle and the like.

BACKGROUND ART

An electric power steering apparatus, which applies an assist torque to a steering system of a vehicle by a rotational torque of a motor, is cited as an application example of a detecting apparatus to detect a torque, a rotational angle and the like. The electric power steering apparatus which provides a steering mechanism of a vehicle with an assist torque by means of a rotational torque of a motor, applies a driving force of the motor as the steering assist torque to a steering shaft or a rack shaft by means of a transmission mechanism such as gears or a belt through a reduction mechanism. In order to accurately generate the torque of an assist force, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel (a handle) 1 is connected to steered wheels 8L and 8R through reduction gears 3, universal joints 4a and 4b, a rack-and-pinion mechanism 5, and tie rods 6a and 6b, further via hub units 7a and 7b. The motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The column shaft 2 is provided with a torque sensor 10 for detecting a steering torque Th of the steering wheel 1 and a steering angle sensor 14 for detecting a steering angle θ that is a rotational angle of the steering wheel 1, as a detecting apparatus or a detector (hereinafter referred to as "detecting means" in a generic name). The control unit 30 calculates a current command value of an assist command by using an assist map or the like on the basis of the steering torque Th detected by the torque sensor 10 and a vehicle speed Vel detected by a vehicle speed sensor 12, and controls a current supplied to the motor 20 by means of a voltage control command value Vref obtained by performing compensation or the like to the calculated current command value.

A controller area network (CAN) 40 to send/receive various information of a vehicle is connected to the control unit 30, and it is possible to receive the vehicle speed Vel from the CAN 40. Further, it is also possible to connect a non-CAN 41 sends and receives a communication, analog/digital signals, a radio wave or the like except with the CAN 40 to the control unit 30.

The control unit 30 mainly comprises a CPU (Central Processing Unit) (including an MCU (Micro Controller Unit), an MPU (Micro Processor Unit) and so on), and general functions performed by programs within the CPU are shown in FIG. 2.

Functions and operations of the control unit 30 will be described with reference to FIG. 2. As shown in FIG. 2, the steering torque Th detected by the torque sensor 10 and the vehicle speed Vel detected by the vehicle speed sensor 12 (or from the CAN 40) are inputted into a current command value calculating section 31 which calculates the current command value Iref1. The current command value calculating section 31 calculates the current command value Iref1, based on the steering torque Th and the vehicle speed Vel with reference to the assist map or the like, which is a control target value of a current supplied to the motor 20. The calculated current command value Iref1 is inputted into a current limiting section 33 via an adding section 32A, and the current command value Irefm whose maximum current is limited is inputted into a subtracting section 32B. A deviation I (=Irefm−Im) between the current command value Irefm and a motor current value Im which is fed-back is calculated at the subtracting section 32B, and the deviation I is inputted into a proportional-integral-control (PI-control) section 35 for improving a current characteristic of the steering operation. The voltage control command value Vref that the characteristic is improved at the PI-control section 35, is inputted into a PWM-control section 36, and the motor 20 is PWM-driven through an inverter 37 serving as a driving section. The motor current value Im of the motor 20 is detected by a motor current detector 38 and is fed-back to the subtracting section 32B. Field-effect transistors (FETs) are used as a driving device at the inverter 37, and the inverter 37 is constituted by a bridge circuit of the FETs.

A compensation signal CM from a compensation signal generating section 34 is added at the adding section 32A. A characteristic compensation of the steering system is performed by adding the compensation signal CM, and a convergence, an inertia characteristic, and the like are improved. The compensation signal generating section 34 adds a self-aligning torque (SAT) 343 to an inertia 342 at an adding section 344. The added result is further added with a convergence 341 at an adding section 345. The added result at the adding section 345 is treated as the compensation signal CM.

As the detecting means used in such an electric power steering apparatus, an apparatus that has a redundancy configuration using multiplexed sensors so that a failure is automatically judged and functions are operated continuously after the failure is occurred in a case that the failure is occurred in the detecting means and a signal line or the like, is proposed.

For example, in Japanese Unexamined Patent Publication No. 2013-253806 A (Patent Document 1), a sensor apparatus that can specify the abnormal signal in the plural detection signals, is easy to manufacture, detects a torsion angle which is an essential part of the steering torque calculation, and comprises plural sensor integrated circuits (sensor ICs) having the plural detecting sections which output the detection signal depending on the detected result, is proposed. The detection signal that the abnormality is occurred can be specified by preparing the plural detecting sections and the plural sensor ICs. Further, the process can be continued by using the normal detection signal. The detection signal from the sensor apparatus is inputted into the control apparatus with the respective signal lines from the detecting sections. The detection signal may be inputted into the control apparatus with one signal line disposed on the sensor ICs.

In the publication of Japanese Patent No. 5688691 B2 (Patent Document 2), the detecting apparatus that an output magnetic detecting device and a reference magnetic detecting device are contained in one IC package so that a circuit size and wirings are reduced and the abnormality of the magnetic sensor can be judged by a simple structure, and further a comparator, which judges the abnormality from the detected values of the output magnetic detecting device and the reference magnetic detecting device, is contained in the same IC package, is proposed. In a case that a difference between the detected value (a provisional value) outputted from the output magnetic detecting device and the detected value (a reference value) outputted from the reference magnetic detecting device is a threshold or less, the provisional detecting value is set as an formal detecting value and the formal detecting value is outputted to an exterior of the IC. By including the plural IC packages, even if one IC package is failed, the control can be continued by using the formal detecting value outputted from the other IC package.

Normally, although the sensor is connected to the control section of the electric power steering apparatus through the signal line, the number of the signal lines also increase when the number of the multiplexed sensors increase. Thus, the apparatus that suppresses the number of the signal lines is proposed. For example, in an actuator control apparatus proposed in Japanese Unexamined Patent Publication No. 2014-234101 A (Patent Document 3), in the reductant configuration that the respective sensors are multiplexed so that the control can be continued even if the abnormality is occurred in the sensor, the sensors having a different function (for example, the torque sensor and the rotational angle sensor) are treated as one group and each of the groups is connected to the control section through a single serial bus. Increasing the number of the signal lines is suppressed by using the single serial bus shared with the sensors. A backup can be performed in a case that the abnormality in the serial bus is occurred, and the information detected by the sensors having the different function can be simultaneously acquired by sharing the serial bus with the sensors having the different function and using the different serial buses in the sensors having the same function.

THE LIST OF PRIOR ART DOCUMENTS

Patent Documents

Patent Document 1: Japanese Unexamined Patent Publication No. 2013-253806 A
Patent Document 2: Japanese Patent No. 5688691 B2
Patent Document 3: Japanese Unexamined Patent Publication No. 2014-234101 A

SUMMARY OF THE INVENTION

Problems to be Solved by the Invention

However, in the sensor apparatus of Patent Document 1, in a case that the detection signals by the individual signal lines from the respective detecting sections are outputted, a failure rate and a cost are liable to increase. In a case that one signal line is used in every sensor IC, the number of the signal lines decrease. For example, when the abnormality is occurred in a harness including the signal due to a voltage variation or the like caused by external noise, the abnormality is detected by judging whether the signal pattern of the detected signal is a normal signal pattern or an abnormal signal pattern. However, since specific signal pattern judging methods are not disclosed in Patent Document 1, some problems are liable to be caused in judgment accuracy and a process amount.

In the detecting apparatus of Patent Document 2, because only the formal detected value (only the abnormal judgement signal when the abnormality is judged) is outputted, the number of the signal lines can be reduced. However, since the abnormality, which is occurred in the above harness, is not considered, in a case that the abnormality is occurred in the above harness, sufficient countermeasure cannot be performed in the detection accuracy or the like.

In the apparatus of Patent Document 3 that aims to suppress an increase in the signal lines, since the sensors are bus-connected to the control section, a Chip-Select (CS) signal line in order to specify (to select) the sensor for communication to the control section is connected to every sensor. Because the serial bus is shared with the sensors having the different function, the bus occupancy time is limited and the sufficient time period cannot be obtained.

The present invention has been developed in view of the above-described circumstances, and an object of the present invention is to provide the detecting apparatus that uses the redundancy configuration comprising the plural sensor sections including the plural detecting sections, accurately performs the abnormality detection and the function continuation in the control apparatus such as the ECU in a case that the abnormality is occurred in the sensor sections or the signal line, and has simple manufacturing processes, and the electric power steering apparatus equipped with the detecting apparatus.

Another object of the present invention is to provide the electric power steering apparatus that suppresses an excessively increase in the signal lines which the detectors are connected to the control section, acquires appropriate information not depending on the configuration of the detectors and enables to continue an operation even when the abnormality is occurred in the detectors, in a case that the electric power steering apparatus is equipped with the detectors having the above redundancy configuration.

Means For Solving the Problems

The present invention relates to a detecting apparatus that has plural sensor sections including plural detecting sections that detecting object and state quantities to detect are same, and detects at least one of the state quantities in at least two of the sensor sections, the above-described object of the present invention is achieved by that comprising: wherein each of the sensor sections comprises a communication section that outputs the state quantities, which the detecting sections detect, as an error detectable signal.

The above-described object of the present invention is efficiently achieved by that: wherein the communication section outputs the state quantities, which the respective detecting sections detect, as one signal; or wherein the signal is outputted in synchronization with a control period; or wherein each of the sensor sections generates the error detectable signal by using a single edge nibble transmission method (a SENT method); or wherein at least four of the sensor sections are provided, a steering torque is detected by at least two of the sensor sections, and a steering angle is detected by at least other two of the sensor sections.

The present invention relates to an electric power steering apparatus that is equipped with the detecting apparatus, and the above-described object of the present invention is achieved by comprising a control section that inputs the error detectable signal outputted from the communication section and that detects abnormality of the detecting apparatus by performing at least one of error detection based on the error detectable signal and an abnormality detection based on plural detected values of the state quantity which is included in the error detectable signal.

The above-described object of the present invention is efficiently achieved by that: wherein the control section continues an operation by using a normal state quantity in a case that the abnormality of the detecting apparatus is detected; or wherein the control section calculates absolute angles of angle information by using plural angle information respectively detected by the plural sensor sections, in a case that the abnormality of the detecting apparatus is not detected, and calculates the absolute angle after the abnormality is detected, by using the normal angle information, and the angle information and the absolute angle just before the abnormality is detected, in a case that the abnormality of the detecting apparatus is detected.

Further, the present invention relates to an electric power steering apparatus that is equipped with a detector that comprises plural sensor sections which include plural detecting sections that detect a same object or a same state quantity, and detects at least one of the state quantities in at least two of the sensor sections, and the above-described another object of the present invention is achieved by that comprising: a control section to perform a driving-control of a motor based on the state quantities, and at least one signal line to connect the sensor sections with the control section, wherein the plural detecting sections in the sensor sections output the state quantities to the control section through same the signal line, and wherein the control section comprises a state quantity estimating section to estimate a state quantity at any time from the state quantities and to output the state quantity as an estimated state quantity, and an abnormality detecting section to detect abnormality of the detector by using an abnormality detection based on the state quantities and the estimated state quantity.

The above-described another object of the present invention is efficiently achieved by that: wherein the control section outputs a selection information that is used in selecting the detecting section outputting the state quantity through the signal line, and wherein the detecting section corresponding to the selection information outputs the state quantity; or wherein the selection information is a signal having a predetermined level, the signals having the predetermined level and having a different time length are assigned to each of the detecting sections and selection of the detecting section outputting the state quantity is performed based on the time length; or wherein the sensor section includes a communication section to output the state quantity as an error detectable signal, and wherein the abnormality detecting section performs an abnormality detection based on the error detectable signal, and detects abnormality of the detector; or wherein the communication section generates the error detectable signal by using a single edge nibble transmission method (a SENT method); or wherein the state quantity estimating section calculates the estimated state quantities by using the plural past values of the state quantities; or wherein the control section continues a driving-control of the motor based on the normal state quantity in a case that the abnormality of the detecting section is detected; or wherein an angle information is existed as one of the state quantities, and wherein the control section calculates absolute angles of angle information by using plural angle information respectively detected by the plural sensor sections, in a case that the abnormality of the detecting apparatus is not detected, and calculates the absolute angles after the abnormality is detected, by using the normal angle information, and the angle information and the absolute angles just before the abnormality is detected, in a case that the abnormality of the detecting apparatus is detected.

Effects of the Invention

In accordance with the detecting apparatus according to the present invention, by having the plural sensor sections including the plural detecting sections, and using the communication method that the error detection is enabled, the detection of the steering torque and the like having sufficient accuracy is enabled even after the abnormality is occurred and the electric power steering apparatus that is equipped with the detecting apparatus can continue the operation. The detecting apparatus is easily manufactured by designing the sensor sections having the similar configuration. Further, in a case that the signal lines are summarized into one signal line, the failure rate and the cost can be reduced.

In accordance with the electric power steering apparatus according to the present invention, by being equipped with the detector comprising the plural sensor sections including the plural detecting sections, outputting the signals by using the same signal line from the plural detecting sections in each of the sensor sections, and estimating the state quantity at any time from the state quantities that the detecting sections detect, the operation can be continued even when the abnormality is occurred in the detector, the number of the signal lines can be reduced, and the appropriate state quantity can be acquired by correcting a gap of an acquiring timing of the detected state quantity.

BRIEF DESCRIPTION OF THE DRAWINGS

In the accompanying drawings:

FIG. 6A is a plan view and FIG. 6B is a perspective view that only a part of the steering angle detecting section is depicted;

MODE FOR CARRYING OUT THE INVENTION

The present invention relates to a detecting apparatus that has a redundancy configuration comprising plural sensor sections including plural detecting sections and detects a torque, a rotational angle or the like, which is a state quantity indicating a state of a detecting object, and an electric power steering apparatus equipped with the detecting apparatus. The detecting apparatus outputs detecting state quantities (detected values) with a communication method that an error detection is enabled. Alternatively, the present invention relates to the electric power steering apparatus (EPS) equipped with a detector that has the above redundancy configuration and detects the torque, the rotational angle or the like, which is the state quantity indicating the state of the detecting object. A control section such as an ECU in the electric power steering apparatus (EPS) is connected to the detector through a bus, and the plural detecting sections in the sensor section input or output signals from or to the control section by using the same bus (the same signal line). The detecting section that outputs the detected state quantity (the detected value) can be selected with selection information which is outputted from the control section. Further, since the detected values outputted from the detecting section through the same signal line has different acquisition timing, an affection (an error) in variation of the detected values by the different acquisition timing is reduced by estimating the state quantity (the estimated state quantity, hereinafter referred to as "estimated value") at any time from the past values of the detected values. The detector can output the detected value with the communication method that the error detection is enabled.

In this connection, the control section can judge the occurrence of the abnormality in the sensor section by comparing the detected values, and can also judge the occurrence of the abnormality in the signal line or the like through which the detected values are transmitted. Further, since the plural sensor sections are included, one sensor section can function as the backup of the other section. In a case that the sensor section cannot output the accurate detected values due to the occurrence of the abnormality, the electric power steering apparatus can continue the operation by using the detected values in which the sensor section outputs the accurate detected values.

Embodiments according to the present invention will be described with reference to the drawings.

Figure 1:
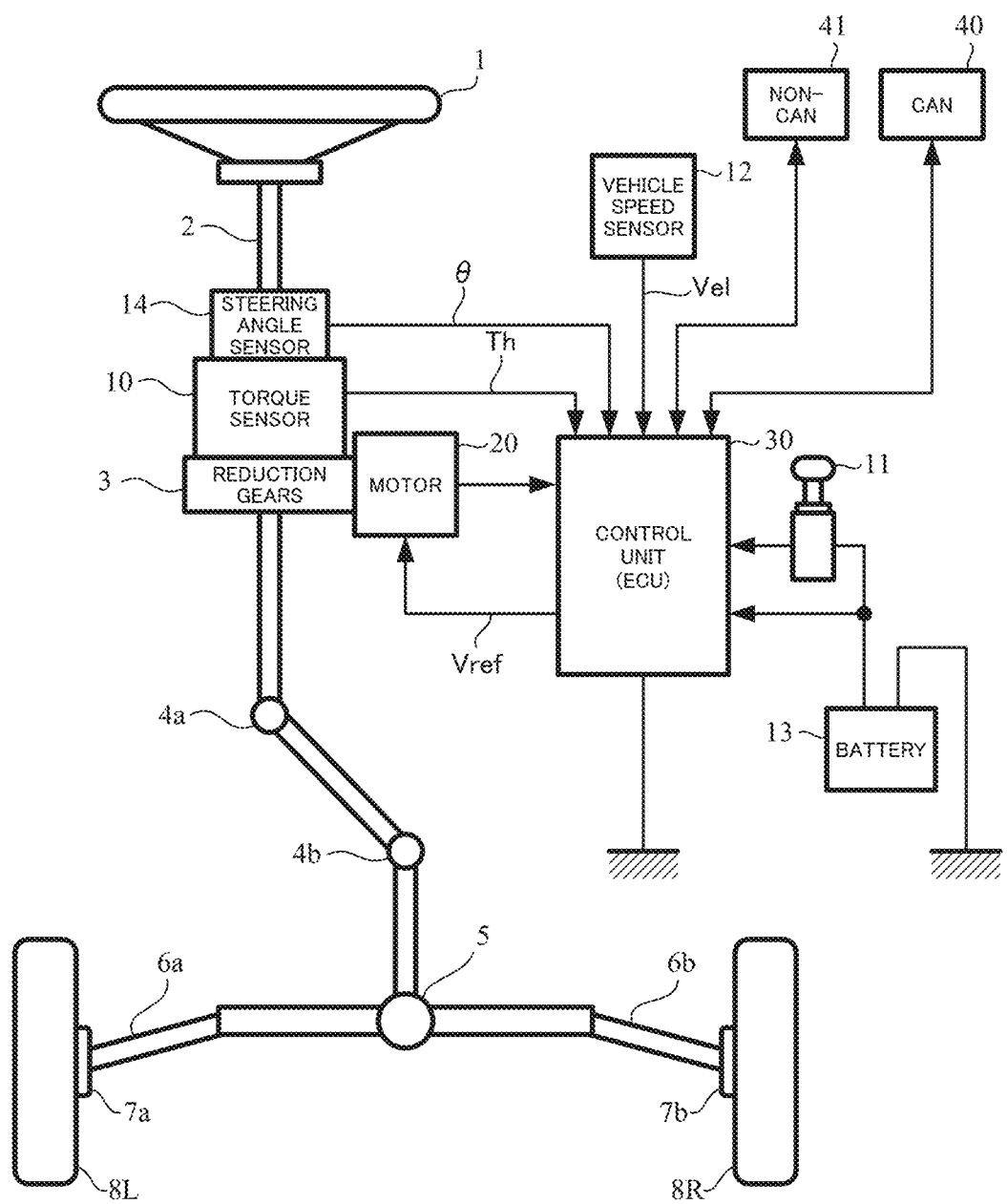
FIG. 1 is a configuration diagram showing a general outline of an electric power steering apparatus.
Figure 3:
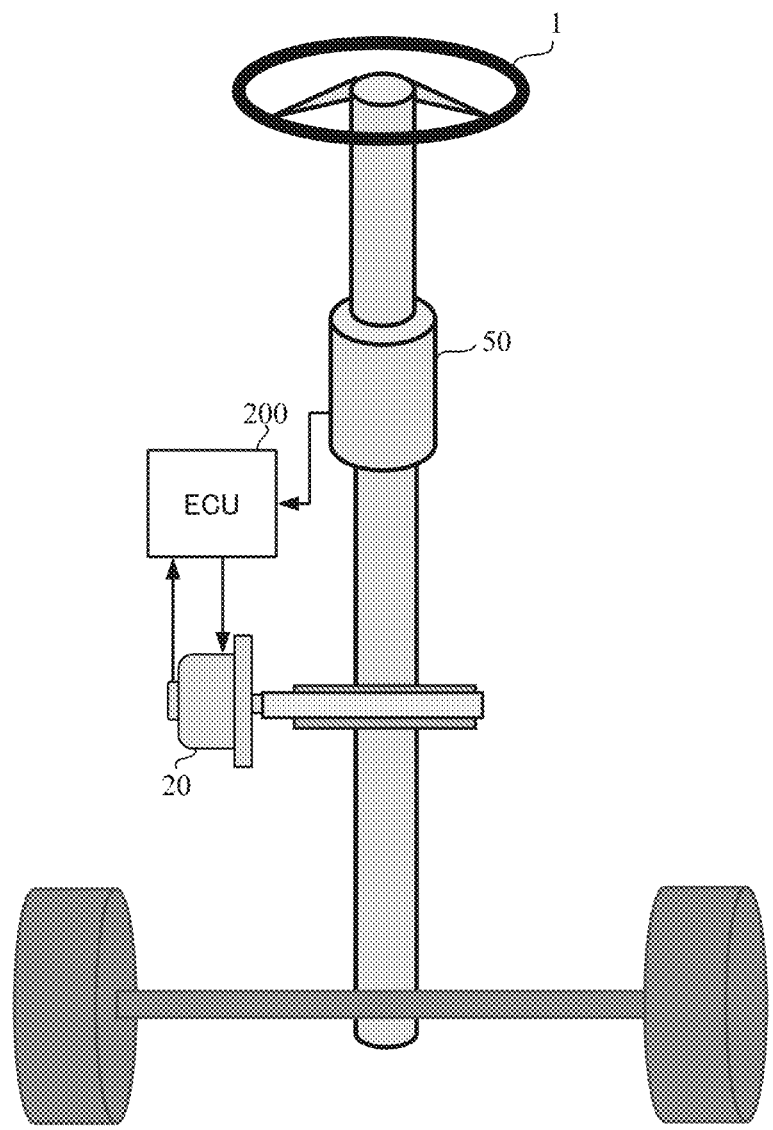
FIG. 3 is a configuration diagram showing an overall configuration example of a detecting apparatus according to the present invention (the first embodiment) and an electric power steering apparatus that includes the detecting apparatus.

FIG. 3 is a configuration diagram showing an overall configuration example included in the electric power electric steering apparatus (the first embodiment), and the detecting apparatus detects a steering torque and a steering angle being one component in angle information. That is, the detecting apparatus functions as a torque angle sensor that has both functions of the torque sensor 10 and the steering angle sensor 14 of the configuration shown in FIG. 1. The steering torque and the steering angle that are outputted from the detecting apparatus (the torque angle sensor) 50 in FIG. 3 are inputted into a control unit (ECU) 200 which serves as the control section. The control unit 200 controls the motor 20, which assists the steering torque of the handle (the steering wheel) 1, based on the steering torque and the steering angle.

The detecting apparatus 50 comprises a torque detecting section 60 that detects the steering torque and a steering angle detecting section 70 that detects the steering angle.

FIGS. 4A, 4B, 4C and 4D are structural diagrams for explaining the configuration example of the torque detecting section 60.

Figure 4A:
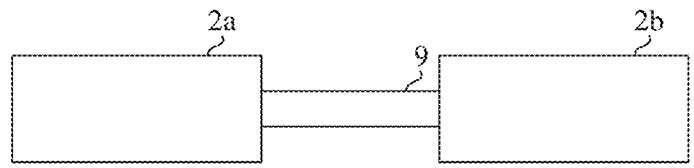
FIGS. 4A, 4B, 4C and 4D are structural diagrams for explaining a configuration example of a torque detecting section.
Figure 4B:
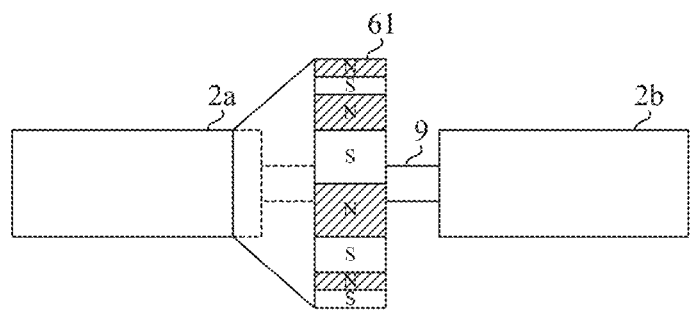
Figure 4C:
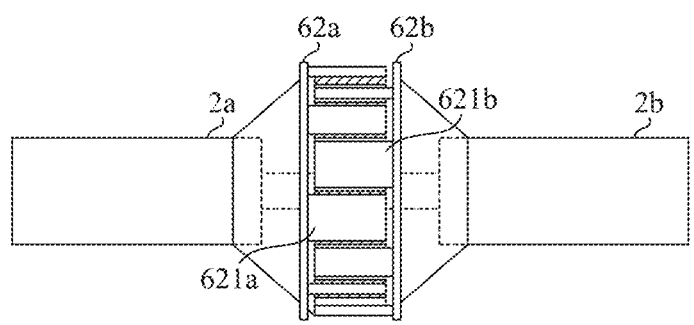
Figure 4D:
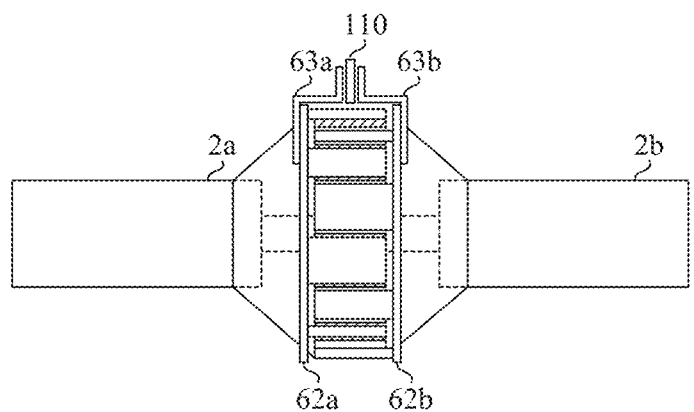

As shown in FIG. 4A, a column shaft of the handle 1 is divided into an input shaft 2a of the handle side and an output shaft 2b of a steering gear side. The torque detecting section 60 comprises a torsion bar 9 which connects the input shaft 2*a* and the output shaft 2*b* each other, a multipole ring magnet 61 that is fixed to the input shaft 2*a*, a pair of sensor yokes 62*a* and 62*b* that are fixed to the output shaft 2*b*, a pair of magnetism collecting yokes 63*a* and 63*b*, and a torque sensor IC (a sensor section) 110. As shown in FIG. 4A, the torsion bar 9 connects the input shaft 2*a* to the output shaft 2*b* so that the central axis of the input shaft 2*a* is coaxially connected with that of the output shaft 2*b*. Torsion is generated when the torque is applied in a circumferential direction of the column shaft. The multipole ring magnet 61, as shown in FIG. 4B, has a cylindrical shape and is fixed to the input shaft 2*a* so that the central axis of the multipole ring magnet 61 is coaxially connected with that of the torsion bar 9, and N-poles and S-poles are alternately magnetized in the circumferential direction. As shown in FIG. 4C, a pair of the sensor yokes 62*a* and 62*b* surround the multipole ring magnet 61, are fixed to the output shaft 2*b* and are annular bodies made of a soft magnetic body. Rectangular-shape pawls 621*a* and 621*b* whose numbers are the same as the N-poles and the S-poles of the multipole ring magnet 61, are disposed on inner side surfaces of the sensor yokes 62*a* and 62*b* at an equal interval, respectively. The pawls 621*a* of the sensor yoke 62*a* and the pawls 621*b* of the sensor yoke 62*b* are alternately disposed so as to be opposed to the N-poles and the S-poles of the multipole ring magnet 61. As shown in FIG. 4D, a pair of the magnetism collecting yokes 63*a* and 63*b* sandwich the sensor yokes 62*a* and 62*b* and a constant space between the magnetism collecting yokes 63*a* and 63*b* are provided, and the torque sensor IC 110 is disposed in this space. The torque sensor IC 110 is connected to the ECU 200 of the electric power steering apparatus through the signal line. As well, although the magnetism collecting yokes 63*a* and 63*b* sandwich the sensor yokes 62*a* and 62*b* in this example, the sensor yokes 62*a* and 62*b* may alternatively sandwich the magnetism collecting yokes 63*a* and 63*b*.

Figure 5A:
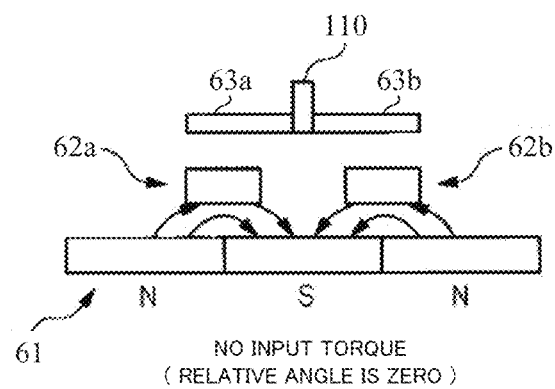
FIGS. 5A and 5B are schematic diagrams for explaining an operation example of the torque detecting section.

The operation of the torque detecting section 60 having such a structure will be described with reference to FIGS. 5A and 5B. In order that the explanation is easily understood, in FIGS. 5A and 5B, the multipole ring magnet 61 is depicted in a planar shape and the scale of the sections is changed.

In a case that the steering torque is not inputted from a driver, that is, in a case that the steering torque is not applied to the input shaft 2*a* and the output shaft 2*b* and the torsion bar 9 is not twisted (a relative angle between the input shaft 2*a* and the output shaft 2*b* is zero), the multipole ring magnet 61 and the sensor yokes 62*a* and 62*b* are disposed so that the center of the pawls 621*a* of the sensor yoke 62*a* and the pawls 621*b* of the sensor yoke 62*b* is coincident with a boundary between the N-pole and the S-pole of the multipole ring magnet 61. In this case, as shown in FIG. 5A, since magnetic fluxes generated from the N-poles of the multipole ring magnet 61 are flowed to the S-poles via the sensor yokes 62*a* and 62*b*, the magnetic flux is not flow to the torque sensor IC 110.

Figure 5B:
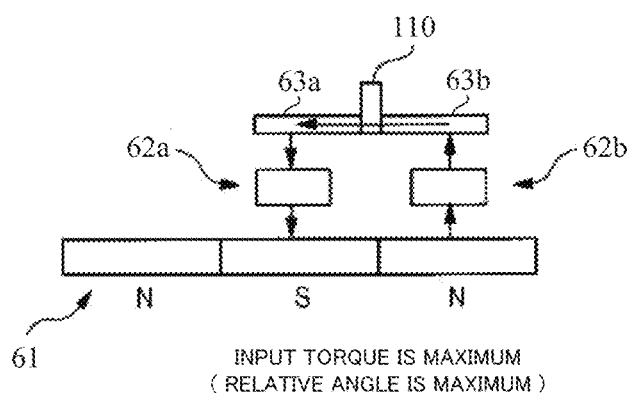

In a case that the driver steers the handle and the steering torque is maximally inputted, that is, in a case that the maximum steering torque is applied to the input shaft 2*a* and the output shaft 2*b* and the torsion bar 9 is maximally twisted (the relative angle is maximum), as shown in FIG. 5B, the magnetic flux generated from the N-pole arrives to the torque sensor IC 110 from the magnetism collecting yoke 63*b* via the sensor yoke 62*b*. The above magnetic flux is returned to the S-pole via the opposite magnetism collecting yoke 63*a* and the opposite sensor yoke 62*a*. At this time, the torque sensor IC 110 outputs the information, which is depended on the detected magnetic flux density, that is, the information, which is linear to the steering torque, to the ECU 200. In a case that the driver steers the handle in a reverse direction to FIG. 5B, because the direction of the magnetic flux that is flowed to the torque sensor IC 110 is reversed, the torque sensor IC 110 can also detect the direction of the steering torque. Hereinafter, the information that is linear to the steering torque is simply referred to as "steering torque".

In the first embodiment, two groups of the magnetism collecting yokes 63*a* and 63*b* and the torque sensor IC 110 are used, each group is disposed in the circumferential direction of the sensor yokes 62*a* and 62*b* at the constant interval.

Figure 6A:
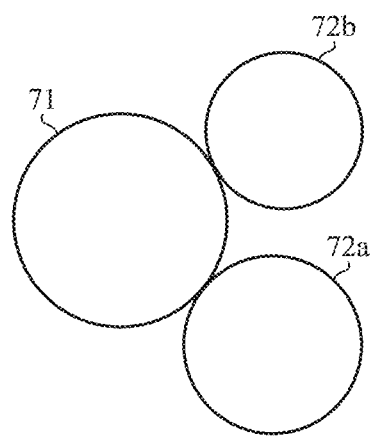
FIGS. 6A and 6B are schematic diagrams showing a configuration example of a steering angle detecting section.
Figure 6B:
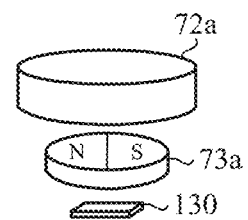

FIGS. 6A and 6B are schematic diagrams showing the configuration example of a steering angle detecting section 70, FIG. 6A is a plan view of the steering angle detecting section 70 and FIG. 6B is a perspective view that only a part of a driven gear 72*a* of the steering angle detecting section 70 is depicted. In FIGS. 6A and 6B, only necessary elements that are used in the explanation of the operation of the steering angle detecting section 70 are depicted, and the shapes of the element are also simplified.

As shown in FIGS. 6A and 6B, the steering angle detecting section 70 comprises a main gear 70 that is fixed to the output shaft 2*b*, the driven gears 72*a* and 72*b* that are engaged with the main gear 71, two-pole magnets 73*a* and 73*b* (not shown) that are fixed to the driven gears 73*a* and 73*b*, respectively, and the steering angle sensor ICs (the sensor sections) 130 and 140 (not shown) that are corresponding to the driven gears 72*a* and 72*b*, respectively, and are fixed to a gear box (a static system). A reduction ratio of the driven gear 72*a* is different from that of the driven gear 72*b*. In a detection range (for example, approximately "±1.5 rotation" by using the handle), the rotational angle (the steering angle) information that is outputted from the steering angle sensor IC 130 paired one driven gear is always different from the rotational angle information from the steering angle sensor IC 140 paired the other driven gear. Accordingly, it is possible to detect the rotational angle in the multiple rotations with the absolute angle just after the ignition key is turned on.

Figure 7:
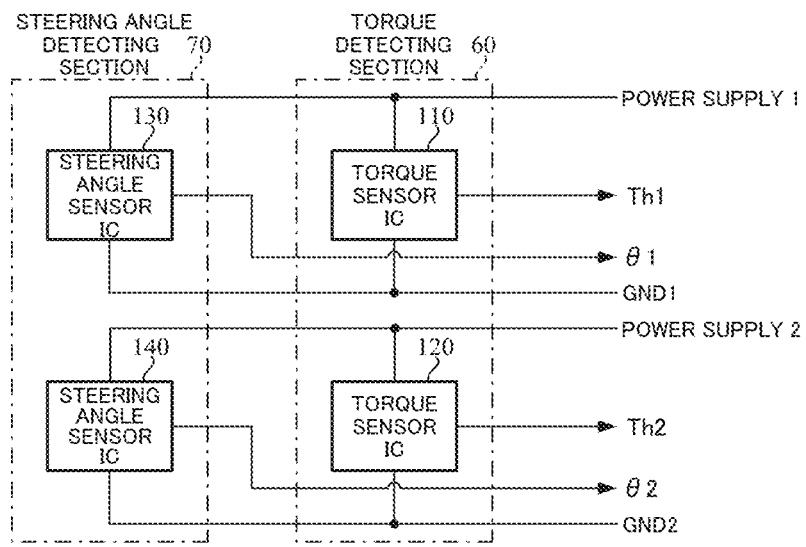
FIG. 7 is a block diagram showing a configuration example around sensor ICs (the first embodiment)

As described above, the torque detecting section 60 of the detecting apparatus 50 has two torque sensor ICs, and the steering angle detecting section 70 has two steering angle sensor ICs. The configuration is shown in FIG. 7. The torque detecting section 60 comprises the torque sensor ICs 110 and 120, and outputs the detected steering torques as the steering torques Th1 and Th2, respectively. The steering angle detecting section 70 comprises the steering angle sensor ICs 130 and 140, and outputs the detected rotational angles (the steering angles) as the steering angles θ1 and θ2, respectively. The torque sensor IC 110 and the steering angle sensor IC 130 are shared with a power supply 1 and a GND 1 (a ground 1), and the torque sensor IC 120 and the steering angle sensor IC 140 are shared with a power supply 2 and a GND 2. By using such a configuration, even in a case that the abnormality is occurred in any wiring (an electric supply line or a ground line), since the normally operating IC is existed, the steering torque detection and the steering angle detection can be continued.

Since the torque sensor ICs 110 and 120 detect strength of the magnetic flux density and the steering angle sensor ICs 130 and 140 detect the direction of the magnetic flux density, the basic function of the torque sensor IC is different from that of the steering angle sensor IC. However, the configuration and the handling to the signals from the respective sensor ICs are the same. Thus, hereinafter, the torque sensor IC and the steering angle sensor IC are considered as a common sensor IC, and the configuration and the operation will be described.

Figure 8:
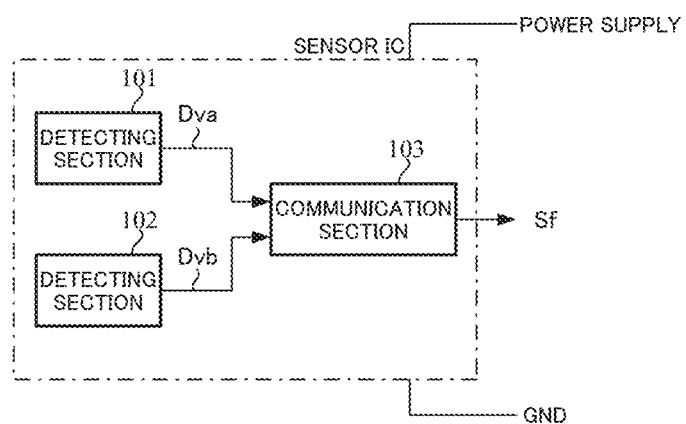
FIG. 8 is a block diagram showing a configuration example of the sensor ICs (the first embodiment)

FIG. 8 shows a configuration example of the sensor IC. The sensor IC includes detecting sections 101 and 102 and a communication section 103.

The detecting sections 101 and 102 output the signals (the detected values) Dva and Dvb depending on the detected state quantities, respectively.

Figure 9:
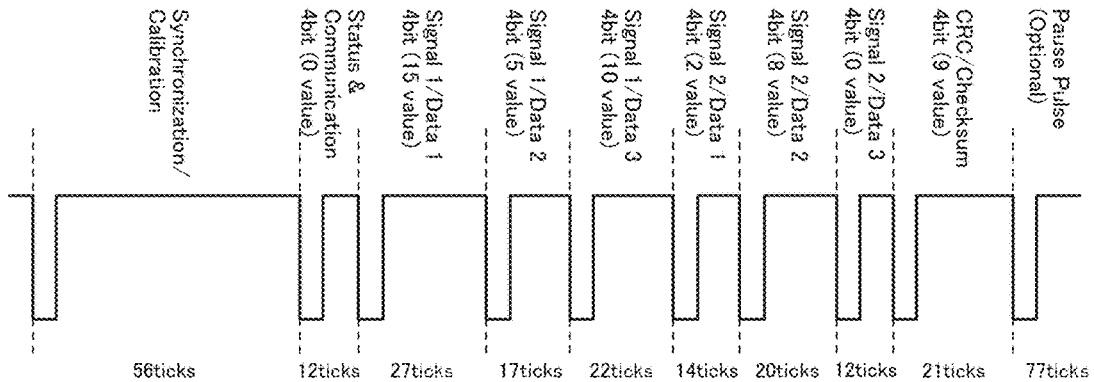
FIG. 9 is a schematic diagram showing a configuration of a SENT frame.

The communication section 103 outputs the detected values Dva and Dvb in one single edge nibble transmission frame (one SENT frame) Sf with a single edge nibble transmission (SENT) method that is one of the signal protocols having the error detection function. The SENT is a coding method authorized by "Society of Automotive Engineers (SAE)", and an outline of the frame configuration used in the SENT communication is shown in FIG. 9. In the SENT communication, one frame comprises a synchronization session, a status session, a data session, a "Cyclic Redundancy Check (CRC)" session and a pause session. The synchronization session is used in order to be synchronized between a transmitter and a receiver. The status session is used in order to send an error code and the like. The transmitted data and the received data are stored in the data session. The error detection is performed by using the CRC session. That is, the CRC data is calculated with the CRC method using a polynomial (a generating polynomial), and is stored in the CRC session. The receiving side (the ECU 200 in the first embodiment) performs the error detection by using the same polynomial used in the communication section 103 based on the CRC data stored in the CRC session. The pause session is used in order that the frame length is a constant length. The detected values Dva and Dvb are assigned to the data session. As shown in FIG. 9, the data session comprises data 1 to data 3 (Data 1 to Data 3) of the signal 1 (the Signal 1) and data 1 to data 3 (Data 1 to Data 3) of the signal 2 (the Signal 2). Since each of the data includes 4 bits, the sum of the data bits is 24 bits. That is, the detecting sections 101 and 102 stores the data having 12 bits and the 24 bit data are outputted to an exterior of the sensor IC.

In the torque sensor IC 110, the detected values Dva and Dvb are the steering torque detected values Th1$a$ and Th1$b$, respectively, and the SENT frame Sf is the steering torque Th1. In the torque sensor IC 120, the detected values Dva and Dvb are the steering torque detected values Th2$a$ and Th2$b$, respectively, and the SENT frame Sf is the steering torque Th2. In the steering angle sensor IC 130, the detected values Dva and Dvb are the steering angle detected value θ1$a$ and θ1$b$, respectively, and the SENT frame Sf is the steering angle θ1. In the steering angle sensor IC 140, the detected values Dva and Dvb are the steering angle detected value θ2$a$ and θ2$b$, respectively, and the SENT frame Sf is the steering angle θ2.

In such a configuration, the operation example of the detecting apparatus 50 according to the first embodiment will be described. Hereinafter, numerals of the elements of the torque sensor IC 110 are assigned to a sign "-1", the numerals of the elements of the torque sensor IC 120 are assigned to a sign "-2", the numerals of the elements of the steering angle sensor IC 130 are assigned to a sign "-3", and the numerals of the elements of the steering angle sensor IC 140 are assigned to a sign "-4". The elements of the respective sensor ICs can be distinguished by the above assignment.

At first, the operation example of the torque detecting section 60 will be described.

When the magnetic flux density that is generated depending on a positional relationship between the multipole ring magnet 61 and the sensor yokes 62$a$ and 62$b$ is flowed to the torque sensor ICs 110 and 120, the four detecting sections, that is, the detecting sections 101-1 and 102-1 in the torque sensor IC 110 and the detecting sections 101-2 and 102-2 in the torque sensor IC 120, detect the above magnetic flux density. The detecting section 101-1 outputs the detected magnetic flux density to the communication section 103-1 as the steering torque detected value Th1$a$, and the detecting section 102-1 outputs the detected magnetic flux density to the communication section 103-1 as the steering torque detected value Th1$b$. The detecting section 101-2 outputs the detected magnetic flux density to the communication section 103-2 as the steering torque detected value Th2$a$, and the detecting section 102-2 outputs the detected magnetic flux density to the communication section 103-2 as the steering torque detected value Th2$b$. The communication section 103-1 stores the inputted steering torque detected values Th1$a$ and Th1$b$ in the SENT frame and outputs these values as the steering torque Th1, and the communication section 103-2 stores the inputted steering torque detected values Th2$a$ and Th2$b$ in the SENT frame and outputs these values as the steering torque Th2. The steering torques Th1 and Th2 are inputted into the ECU 200.

Next, the operation example of the steering angle detecting section 70 will be described.

The four detecting sections, that is, the detecting sections 101-3 and 102-3 in the steering angle sensor IC 130 and the detecting sections 101-4 and 102-4 in the steering angle sensor IC 140, detect the rotational angle (the steering angle) of the two-pole magnets based on the positional relationship between two pairs of the two-pole magnets and the steering angle sensor ICs. The detecting section 101-3 outputs the detected steering angle to the communication section 103-3 as the steering angle detected value θ1$a$, and the detecting section 102-3 outputs the detected steering angle to the communication section 103-3 as the steering angle detected value θ1$b$. The detecting section 101-4 outputs the detected steering angle to the communication section 103-4 as the steering angle detected value θ2$a$, and the detecting section 102-4 outputs the detected steering angle to the communication section 103-4 as the steering angle detected value θ2$b$. The communication section 103-3 stores the inputted steering angle detected values θ1$a$ and θ1$b$ in the SENT frame and outputs these values as the steering angle θ1, and the communication section 103-4 stores the inputted steering angle detected values θ2$a$ and θ2$b$ in the SENT frame and outputs these values as the steering angle θ2. The steering angles θ1 and θ2 are inputted into the ECU 200.

Based on the operation example of the above detecting apparatus 50, the abnormality detection method and the accuracy verification method of the detected values in the ECU 200 of the electric power steering apparatus will be described with respect to the abnormality occurrence portions.

Figure 10:
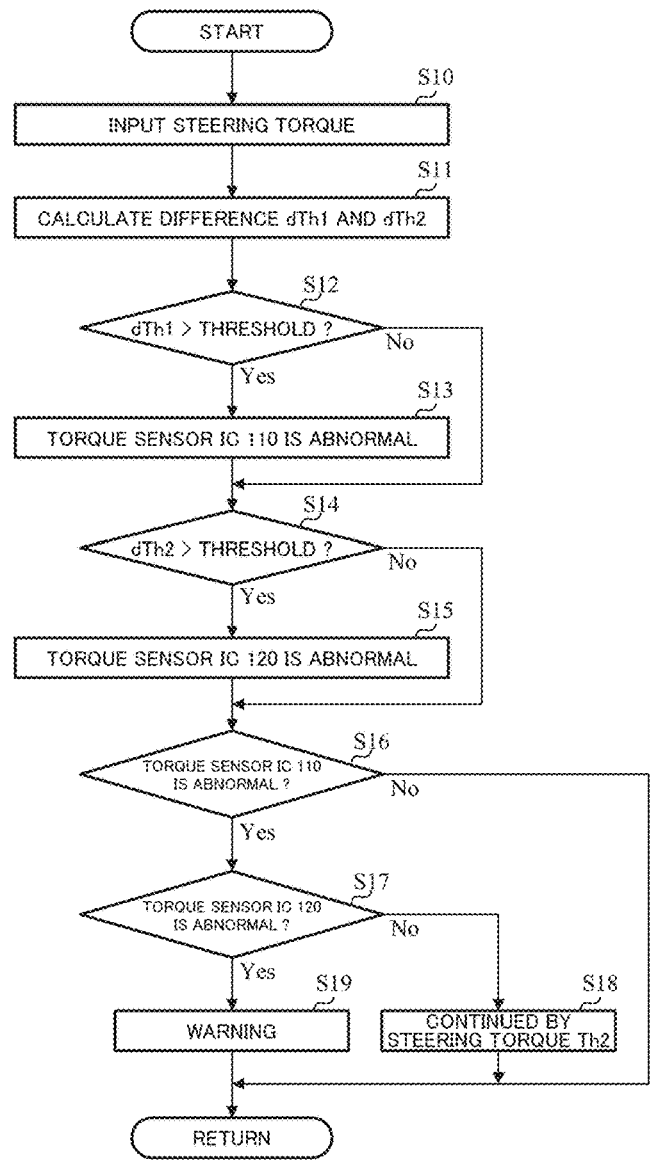
FIG. 10 is a flowchart showing an operation example in a case that abnormality is occurred in a torque sensor IC (the first embodiment)

At first, a case that the abnormality is occurred in the torque sensor IC will be described with reference to the flowchart of FIG. 10. When normally operating, it is assumed that the ECU 200 performs the control by using the steering torque Th1 outputted from the torque sensor IC 110.

The ECU 200 inputs the steering torques Th1 and Th2 (Step S10), calculates a difference dTh1 (=Th1$a$−Th1$b$) between the steering torque detected values Th1$a$ and Th1$b$ which are stored in the steering torque Th1 and the difference dTh2 (=Th2a−Th2b) between the steering torque detected values Th2a and Th2b which are stored in the steering torque Th2 (Step S11), and compares the differences dTh1 and dTh2 with a predetermined threshold FxT. In a case that the abnormality is occurred in the torque sensor IC, since a magnitude of the difference in the steering torque that is outputted from the torque sensor IC in which the abnormality is occurred is larger than the threshold FxT, the abnormality can be detected. In a case that the difference dTh1 (the absolute value) is larger than the threshold FxT (Step S12), it is judged that the abnormality is occurred in the torque sensor IC 110 (Step S13). In a case that the difference dTh2 (the absolute value) is larger than the threshold FxT (Step S14), it is judged that the abnormality is occurred in the torque sensor IC 120 (Step S15). In a case that the magnitude of the difference is not larger than the threshold FxT, it is judged that the abnormality is not occurred and the steering torque detected value has a sufficient accuracy. Therefore, in a case that it is judged that the abnormality is occurred in the torque sensor IC 110 (Step S16), when the abnormality is not occurred in the torque sensor IC 120 (Step S17), it is judged that the steering torque detected values Th2a and Th2b have the sufficient accuracy, and the operation is continued by using these values (Step S18). When the abnormality is also occurred in the torque sensor IC 120 (Step S17), it is judged that the abnormality is occurred in both the torque sensor ICs 110 and 120, and warning is issued (Step S19).

As well, although the comparison is performed by using the same threshold FxT for the differences dTh1 and dTh2, the different thresholds may be used in the comparison.

Figure 11:
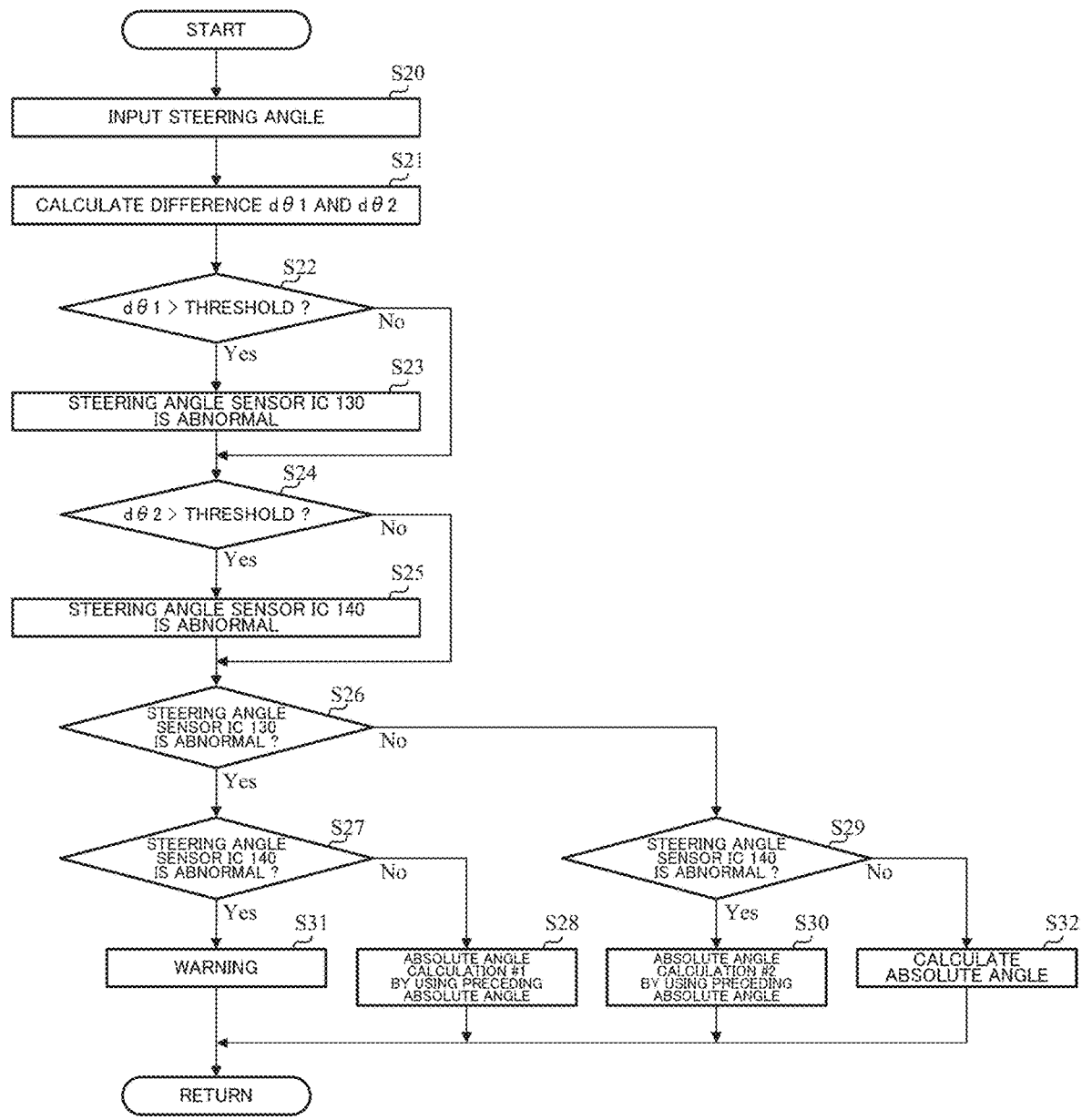
FIG. 11 is a flowchart showing an operation example in a case that abnormality is occurred in a steering angle sensor IC (the first embodiment)

Next, a case that the abnormality is occurred in the steering angle sensor IC will be described with reference to the flowchart of FIG. 11. When normally operating, it is assumed that the ECU 200 calculates the absolute angle by the steering angle θ1 outputted from the steering angle sensor IC 130 and the steering angle θ2 outputted from the steering angle sensor IC 140 (Step S32).

In this case, as well as a case of the torque sensor IC, the ECU 200 inputs the steering angles θ1 and θ2 (Step S20), calculates the difference dθ1 (=θ1a−θ1b) between the steering angle detected values θ1a and θ1b which are stored in the steering angle θ1, and the difference dθ2 (=θ2a−θ2b) between the steering angle detected values θ2a and θ2b which are stored in the steering angle θ2 (Step S21), and compares the differences dθ1 and dθ2 with a predetermined threshold FxA. In a case that the abnormality is occurred in the steering angle sensor IC, since the magnitude of the difference for the steering angle that is outputted from the steering angle sensor IC in which the abnormality is occurred is larger than the threshold FxA, the abnormality can be detected. In a case that the difference dθ1 (the absolute value) is larger than the threshold FxA (Step S22), it is judged that the abnormality is occurred in the steering angle sensor IC 130 (Step S23). In a case that the difference dθ2 (the absolute value) is larger than the threshold FxA (Step S24), it is judged that the abnormality is occurred in the steering angle sensor IC 140 (Step S25). In a case that the magnitude of the difference is not larger than the threshold FxA, it is judged that the abnormality is not occurred and the steering angle detected value has a sufficient accuracy. However, in a case that it is judged that the abnormality is occurred in one of the steering angle sensor ICs, even when it is judged that the steering angle detected value from the other of the steering angle sensor ICs has the sufficient accuracy, the absolute angle cannot be directly calculated from the above steering angle detected value.

Thus, the absolute angle is calculated based on the absolute angle information just before the abnormality is occurred. That is, the ECU 200 holds the steering angle θ1 inputted from the steering angle sensor IC 130, the steering angle θ2 inputted from the steering angle sensor IC 140 and the absolute angle calculated from the steering angles θ1 and θ2 until the subsequent steering angles θ1 and θ2 are inputted. In a case that it is judged that the abnormality is occurred in the steering angle sensor IC 130 (Step S26) and the abnormality is not occurred in the steering angle sensor IC 140 (Step S27), the absolute angle after the abnormality occurrence is calculated by adding the difference between the inputted steering angle θ2 and the preceding steering angle θ2 to the preceding absolute angle (Step S28). In a case that it is judged that the abnormality is not occurred in the steering angle sensor IC 130 (Step S26) and the abnormality is occurred in the steering angle sensor IC 140 (Step S29), the absolute angle after the abnormality occurrence is calculated by adding the difference between the inputted steering angle θ1 and the preceding steering angle θ1 to the preceding absolute angle (Step S30). When the abnormality is occurred in both the steering angle sensor ICs 130 and 140, the warning is issued (Step S31).

Although the comparison is performed by using the same threshold FxA for the differences dθ1 and dθ2, the different thresholds may be used in the comparison.

Figure 12:
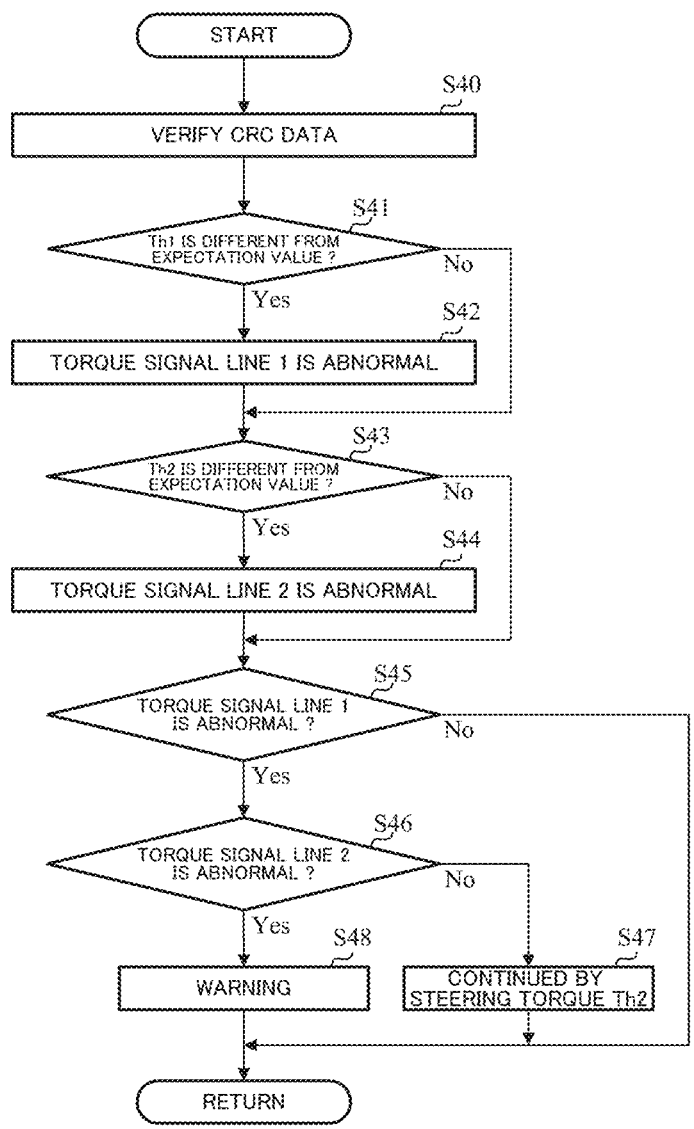
FIG. 12 is a flowchart showing an operation example in a case that abnormality is occurred in a torque signal line (the first embodiment)

Next, a case that the abnormality is occurred in the signal line (hereinafter referred to as "the torque signal line") that transmits the steering torque (the signal) by connecting the torque sensor IC and the ECU 200 each other will be described with reference to the flowchart of FIG. 12. When normally operating, it is assumed that the ECU 200 performs the control by using the steering torque Th1 outputted from the torque sensor IC 110.

By using the values (the CRC data) of the CRC session in the respective SENT frames of the steering torques Th1 and Th2, the ECU 200 verifies whether the abnormality is occurred or not. In a case that the abnormality is occurred in the torque signal line, since the CRC data is different from an expectation value, the abnormality can be detected. The ECU 200 verifies the respective CRC data of the steering torques Th1 and Th2 (Step S40). Then, in a case that the CRC data in the SENT frame of the steering torque Th1 is different from the expectation value (Step S41), the ECU 200 judges that the abnormality is occurred in the torque signal line (hereinafter referred to as "the torque signal line 1") between the torque sensor IC 110 and the ECU 200 (Step S42). In a case that the CRC data in the SENT frame of the steering torque Th2 is different from the expectation value (Step S43), the ECU 200 judges that the abnormality is occurred in the torque signal line (hereinafter referred to as "the torque signal line 2") between the torque sensor IC 120 and the ECU 200 (Step S44). In a case that the CRC data is the expectation value, it is judged that the abnormality is not occurred in the torque signal line. Consequently, in a case that it is judged that the abnormality is occurred in the torque signal line 1 (Step S45), when the abnormality is not occurred in the torque signal line 2 (Step S46), the operation is continued by using the steering torque Th2 (Step S47). When the abnormality is also occurred in the torque signal line 2 (Step S46), the warning is issued (Step S48).

Figure 13:
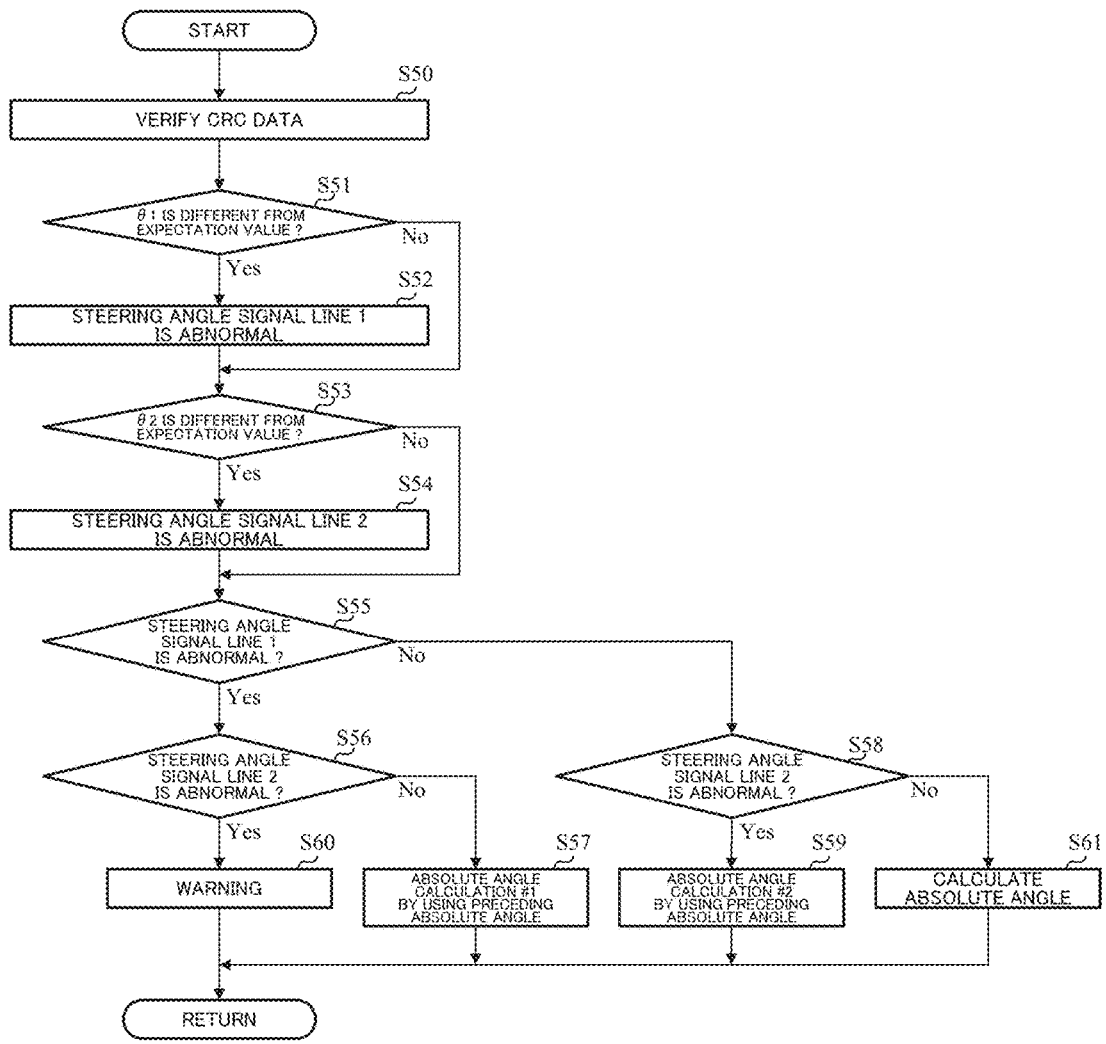
FIG. 13 is a flowchart showing an operation example in a case that abnormality is occurred in a steering angle signal line (the first embodiment)

Next, a case that the abnormality is occurred in the signal line (hereinafter referred to as "the steering angle signal line") that transmits the steering angle (the signal) by connecting the steering angle sensor IC and the ECU 200 each other will be described with reference to the flowchart of FIG. 13. When normally operating, it is assumed that the ECU 200 calculates the absolute angle by using the steering angle θ1 outputted from the steering angle sensor IC 130 and the steering angle θ2 outputted from the steering angle sensor IC 140 (Step S61).

In this case, as well as a case of the torque signal line, by using the CRC data in the respective SENT frames of the steering angles θ1 and θ2, the ECU 200 verifies whether the abnormality is occurred or not. In a case that the abnormality is occurred in the steering angle signal line, since the CRC data is different from an expectation value, the abnormality can be detected. The ECU 200 verifies the respective CRC data of the steering angles θ1 and θ2 (Step S50). In a case that the CRC data in the SENT frame of the steering angle θ1 is different from the expectation value (Step S51), the ECU 200 judges that the abnormality is occurred in the steering angle signal line (hereinafter referred to as "the steering angle signal line 1") between the steering angle sensor IC 130 and the ECU 200 (Step S52). In a case that the CRC data in the SENT frame of the steering angle θ2 is different from the expectation value (Step S53), the ECU 200 judges that the abnormality is occurred in the steering angle signal line (hereinafter referred to as "the steering angle signal line 2") between the steering angle sensor IC 140 and the ECU 200 (Step S54). In a case that the CRC data is the expectation value, it is judged that the abnormality is not occurred in the steering angle signal line. In a case that it is judged that the abnormality is occurred in one of the steering angle signal lines, even when it is judged that the abnormality is not occurred in the other of the steering angle signal lines, the absolute angle cannot be directly calculated from the other of the steering angle signal lines. As well as a case that the abnormality is occurred in the steering angle sensor IC, the absolute angle is calculated based on the absolute angle information just before the abnormality is occurred. That is, in a case that it is judged that the abnormality is occurred in the steering angle signal line 1 (Step S55) and the abnormality is not occurred in the steering angle signal line 2 (Step S56), the absolute angle after the abnormality occurrence is calculated by adding the difference between the inputted steering angle θ2 and the preceding steering angle θ2 to the preceding absolute angle (Step S57). In a case that the abnormality is not occurred in the steering angle signal line 1 (Step S55) and the abnormality is occurred in the steering angle signal line 2 (Step S58), the absolute angle after the abnormality occurrence is calculated by adding the difference between the inputted steering angle θ1 and the preceding steering angle θ1 to the preceding absolute angle (Step S59). In a case that it is judged that the abnormality is occurred in both the steering angle signal line 1 and the steering angle signal line 2, the warning is issued (Step S60). Besides, the abnormality due to an external disturbance noise is detectable.

Finally, a case that the abnormality is occurred in the electric supply lines (hereinafter referred to as "an electric supply line 1" and "an electric supply line 2", respectively) for the power supply 1 and the power supply 2 and the ground lines (hereinafter referred to as "a ground line 1" and "a ground line 2", respectively) for the GND 1 and the GND 2, which are connected to the respective sensor ICs, will be described.

In a case that the abnormality is occurred in the wiring (the electric supply line or the ground line), since the power supply voltage supplied to the sensor IC, which is connected to the wiring in which the abnormality is occurred, is out of a normal operating range, the abnormality is detectable by the comparison check (the verification whether the two object data are consistent or not) between the two steering torque detected values, which are stored in the steering torques from the respective sensor ICs and/or the comparison check between the two steering angle detected values, which are stored in the steering angles, or the CRC data check in the SENT frame of the steering torque and/or the steering angle. For example, in a case that the inconsistency is verified in the comparison check between the steering torque detected values Th1a and Th1b and/or the comparison check between the steering angle detected values θ1a and θ1b, or in a case that the CRC data in the SENT frame of the steering torque Th1 and/or the steering angle θ1 is different from the expectation value, it can be judged that the abnormality is occurred in the electric supply line 1 and/or the ground line 1. In a case that there is no problem in the comparison checks to the steering torque detected value and the steering angle detected value, and the CRC data check in the SENT frame of the steering torque and the steering angle, it is judged that the steering torque detected values and the steering angle detected values have a sufficient accuracy. Accordingly, for example, in a case that it is judged that the abnormality is occurred in the electric supply line 1 and/or the ground line 1, if there is no problem in the respective results of the comparison check between the steering torque detected values Th2a and Th2b, the comparison check between the steering angle detected values θ2a and θ2b, and the CRC data check in the SENT frame of the steering torque Th2 and the steering angle θ2, it is judged that the steering torque detected values Th2a and Th2b and the steering angle detected values θ2a and θ2b have a sufficient accuracy, and the operation is continued with these values. However, in a case that the absolute angle is calculated from only the steering angle detected values θ2a and θ2b, the absolute angle is calculated based on the absolute angle information just before the abnormality occurrence, as well as a case that the abnormality is occurred in the steering angle sensor IC or the steering angle signal line. Even in a case that it is judged that the abnormality is occurred in the electric supply line 2 and/or the ground line 2, the operation is continued by using the similar method.

In this way, the detecting apparatus 50 comprises the two torque sensor ICs and the two steering angle sensor ICs, and the respective sensor ICs comprise the two detecting sections. Further, since the communication section outputs the steering torque and the steering angle to the ECU 200 by the SENT communication, the ECU 200 can judge the abnormality occurrence in the sensor ICs and the wirings. In a case that the abnormality is occurred in one of the systems, the operation can be continued by using the other system.

Figure 14:
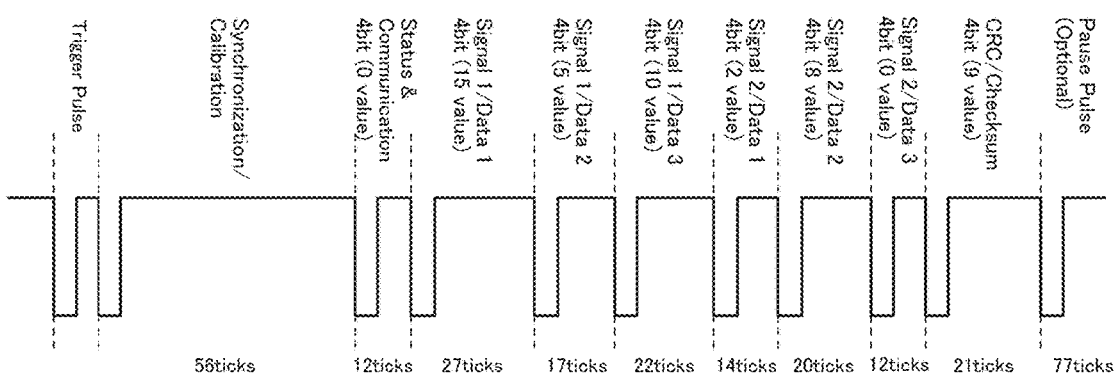
FIG. 14 is a schematic diagram showing a configuration of the SENT frame that synchronization function is added.

As well, although the SENT communication is normally asynchronous communication, the detected values may be acquired in synchronization with a period (a control period) of a control of the ECU 200 by using the communication synchronized in a trigger pulse from the ECU 200 as shown in FIG. 14. Thereby, more stable control can be performed. Furthermore, the signal protocol other than the SENT communication, which has an error detection function, may be used.

Figure 15:
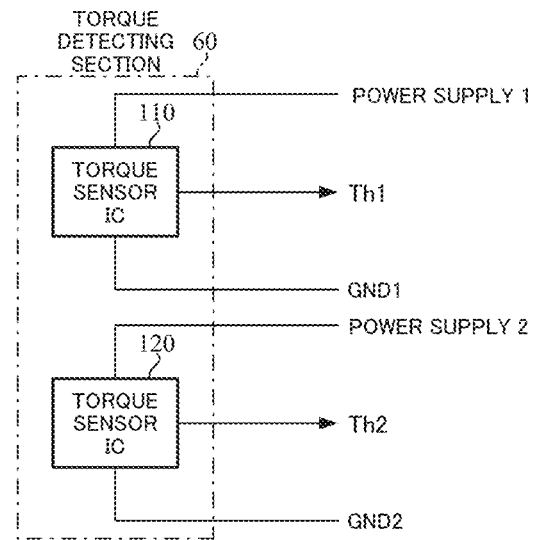
FIG. 15 is a block diagram showing a configuration example around the sensor ICs (the second embodiment)
Figure 16:
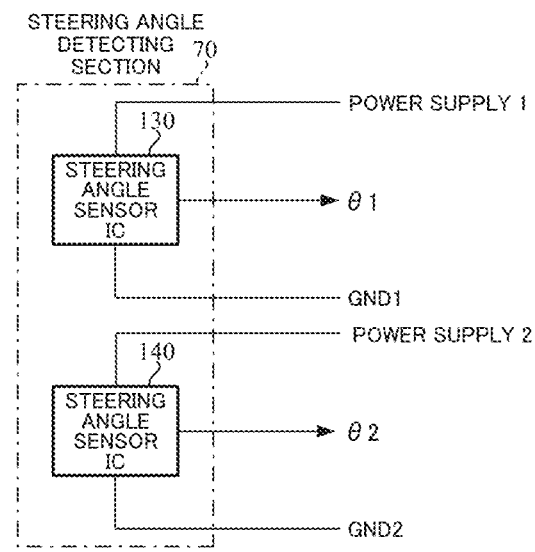
FIG. 16 is a block diagram showing a configuration example around the sensor ICs (a third embodiment)

Although the first embodiment comprises the torque detecting section 60 and the steering angle detecting section 70, it may be constituted by only the torque detecting section 60 or only the steering angle detecting section 70. The configuration example (the second embodiment) that is constituted by only the torque detecting section 60 and the configuration example (the third embodiment) that is constituted by only the steering angle detecting section 70 are shown in FIGS. 15 and 16, respectively. The operation of the second embodiment shown in FIG. 15 is the same as that of the torque detecting section 60 in the first embodiment, and the operation of the third embodiment shown in FIG. 16 is the same as that of the steering angle detecting section 70 in the first embodiment.

Figure 17:
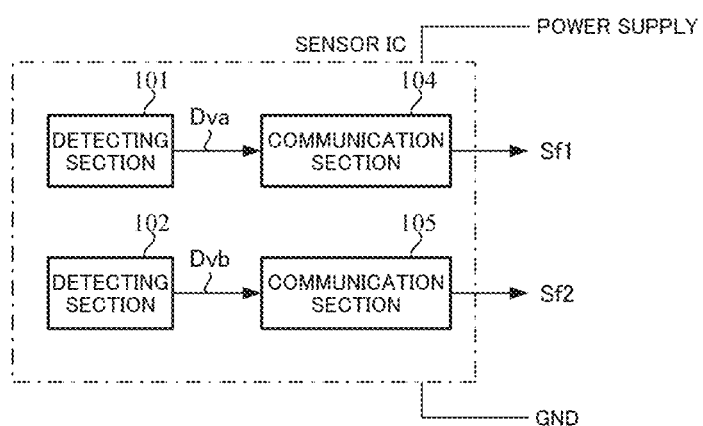
FIG. 17 is a block diagram showing a configuration example of the sensor IC (the fourth embodiment)

One communication section is provided in the respective sensor ICs in the first embodiment. However, the communication section is provided in each of the detecting sections, and each of the sensor ICs may comprise two communication sections. The configuration example (the fourth embodiment) of the sensor ICs comprising the two communication sections is shown in FIG. 17. In the fourth embodiment, the detected value Dva outputted from the detecting section 101 is inputted into the communication section 104, and the detected value Dvb outputted from the detecting section 102 is inputted into the communication section 105. The communication section 104 outputs the detected value Dva as the SENT frame Sf1 by the SENT method as well as that of the communication section 103, and the communication section 105 also outputs the detected value Dvb as the SENT frame Sf2 by the SENT method. Thereby, comparing with the first embodiment, the signal lines increase but the risk that the normal detected value cannot be acquired due to the signal line abnormality can be dispersed.

In the above embodiments (the first to fourth embodiments), the detecting apparatus is used for detecting the steering torque and the steering angle in the electric power steering apparatus. The detecting apparatus may be used for detecting the state quantities other than the steering torque and the steering angle, for example, the rotational angle of the motor or the like, and may also be used for the apparatus other than the electric power steering apparatus.

Other embodiments of the present invention will be described.

Figure 18:
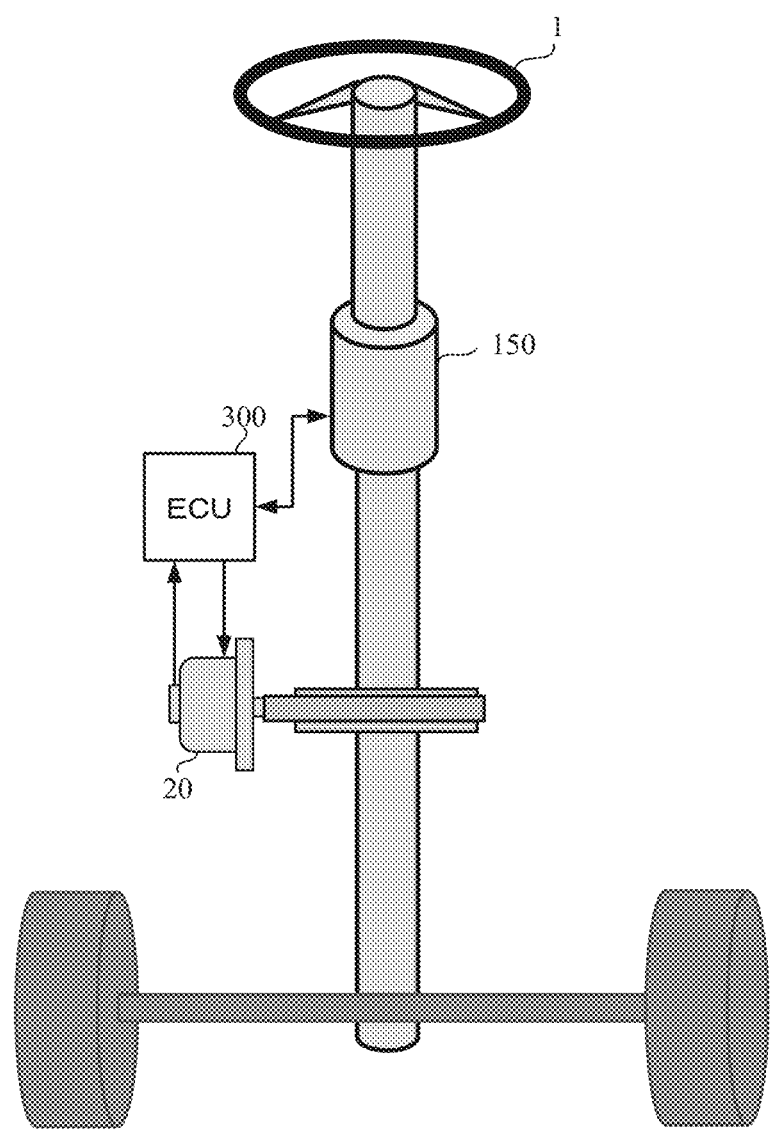
FIG. 18 is a block diagram showing a configuration example of the present invention (the fifth embodiment)

The configuration example of the fifth embodiment according to the present invention is shown in FIG. 18. The detector 150 functions as the torque angle sensor that has both functions of the torque sensor 10 and the steering angle sensor 14 of the configuration shown in FIG. 1, and detects the steering torque and the steering angle being one of the angle information. The steering torque and the steering angle outputted from the detector (the torque angle sensor) 150 of FIG. 18 are inputted into the control unit (ECU) 300 serving as the control section. The control unit 300 controls the motor 20 that assists the steering torque of the handle 1 based on the steering torque and the steering angle in similar to the ECU 200 in FIG. 3.

At first, the configuration example of the detector 150 with reference to the present embodiment will be described.

The detector 150 comprises the torque detecting section 160 to detect the steering torque and the steering angle detecting section 170 to detect the steering angle.

The torque detecting section 160 has the similar configuration to that of the torque detecting section 60 in the first embodiment shown in FIGS. 4A, 4B, 4C and 4D. however, the torque sensor IC 210 instead of the torque sensor IC 110 is disposed in the torque detecting section 160, and the torque sensor IC 210 is connected to the ECU 300 through the signal line. The torque detecting section 160 performs the similar operation to that of the torque detecting section 60 in the first embodiment shown in FIG. 5. In this time, the torque sensor IC 210 performs the operation of the torque sensor IC 110.

The steering angle detecting section 170 has the similar configuration to that of the steering angle detecting section 70 in the first embodiment schematically shown in FIGS. 6A and 6B, and performs the similar operation. However, the steering angle detecting section 170 comprises the steering angle sensor ICs 230 and 240 instead of the steering angle sensor ICs 130 and 140, and the steering angle sensor ICs 230 and 240 perform the operations of the steering angle sensor ICs 130 and 140, respectively.

Figure 19:
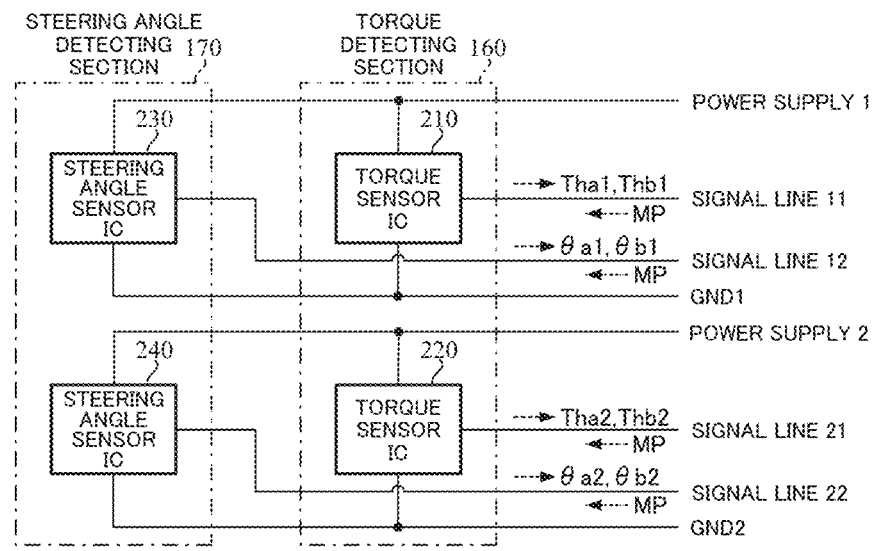
FIG. 19 is a block diagram showing a configuration example around the sensor ICs (the fifth embodiment)

The torque detecting section 160 of the detector 150 comprises the two torque sensor ICs, the steering angle detecting section 170 comprises the two steering angle sensor ICs and the configuration is shown in FIG. 19. The torque detecting section 160 comprises the torque sensor ICs 210 and 220. The torque sensor IC 210 outputs the detected steering torques Tha1 and Thb1 through the signal line 11, and the torque sensor IC 220 outputs the detected steering torques Tha2 and Thb2 through the signal line 21. The steering angle detecting section 170 comprises the steering angle sensor ICs 230 and 240. The steering angle sensor IC 230 outputs the detected rotational angles (the steering angles) θa1 and θb1 through the signal line 12, and the steering angle sensor IC 240 outputs the detected steering angles θa2 and θb2 through the signal line 22. A master pulse (selection information) MP outputted from the ECU 300 is inputted into the torque sensor ICs 210 and 220 and the steering angle sensor ICs 230 and 240 through the signal lines that are connected to the respective sensor ICs. The torque sensor IC 210 and the steering angle sensor IC 230 are shared with the power supply 1 and the GND (the ground) 1, and the torque sensor IC 220 and the steering angle sensor IC 240 are shared with the power supply 2 and the GND 2. By employing such a configuration, even when the abnormality is occurred in any wiring (the electric supply line or the ground line), since the normal operation ICs are existed as well as a case of the first embodiment, the steering torque detection and the steering angle detection can be continued.

In the torque sensor ICs 210 and 220 and the steering angle sensor ICs 230 and 240, since the torque sensor ICs 210 and 220 detect the strength of the magnetic flux density and the steering angle sensor ICs 230 and 240 detect the direction of the magnetic flux density, the basic function of the torque sensor IC is different from that of the steering angle sensor IC. However, the configuration and the handling to the signals from the respective sensor ICs are the same. Therefore, hereinafter, the torque sensor IC and the steering angle sensor IC are considered as a common sensor IC, and the configuration and the operation will be described.

Figure 20:
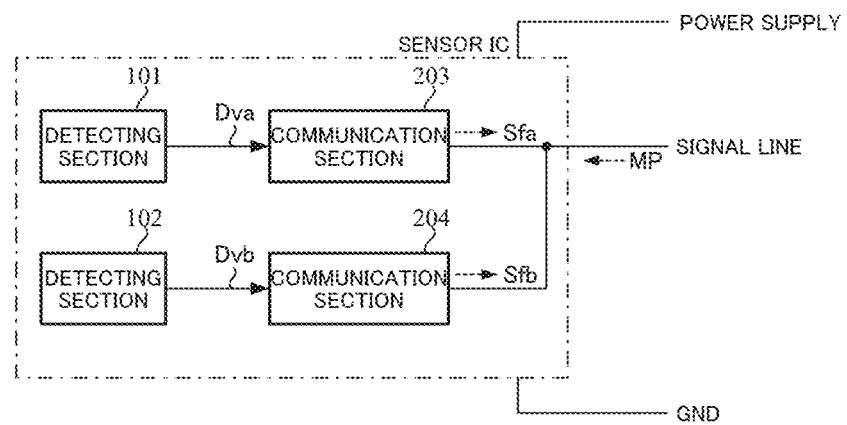
FIG. 20 is a block diagram showing a configuration example of the sensor IC (the fifth embodiment)

The configuration example of the sensor IC is shown in FIG. 20. The sensor IC comprises the detecting sections 101 and 102 and the communication sections 203 and 204.

The detecting sections 101 and 102, as well as a case of the first embodiment, output the signals (the detected values) Dva and Dvb, depending on the detected state quantities, respectively.

The communication section 203 outputs the detected value Dva as the SENT frame Sfa to the ECU 300 with the SENT method through the signal line, and the communication section 204, as well as the communication section 203, also outputs the detected value Dvb as the SENT frame Sfb to the ECU 300 with the SENT method through the signal line.

The SENT frames Sfa and Sfb are outputted to the ECU 300 through the same signal line, and the selection of which frame is outputted is determined by the master pulse MP outputted from the ECU 300. That is, a unique master pulse is defined to each of the detecting sections, in a case that the communication section 203 and 204 judge that the inputted master pulse MP is coincident with the master pulse which is connected to self-communication section, the communication sections 203 and 204 input the detected values from the detecting sections and outputs the detected values as the SENT frame. For example, a Low-level signal having a predetermined time length is used as the master pulse, and the unique master pulse is identified by changing the time length to each of the detecting sections. In this connection, the communication sections 203 and 204 determine whether they output the SENT frame or not, by checking the time length of the Low-level in the master pulse.

Figure 21:
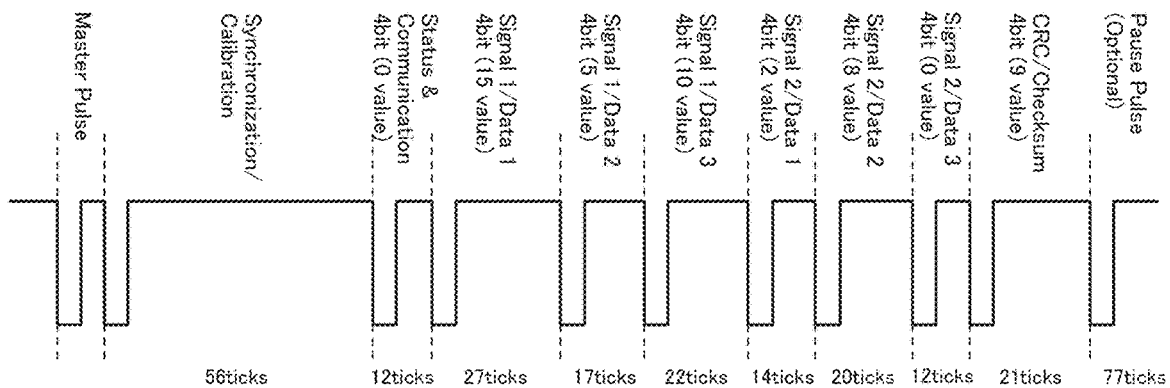
FIG. 21 is a schematic diagram showing a frame configuration of a SENT derivative protocol handling a master pulse.
Figure 22:
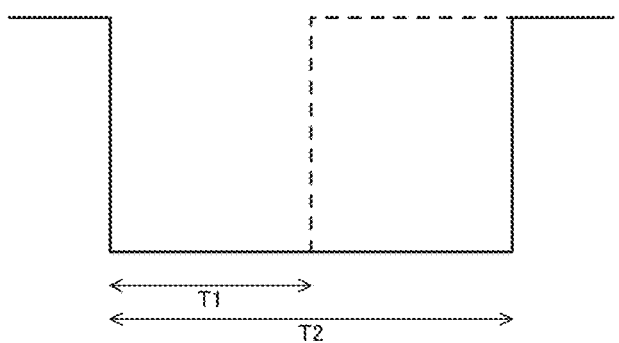
FIG. 22 is a schematic diagram showing an example of the master pulse.

FIG. 21 shows an outline of the frame configuration of the SENT derivative protocol that is adaptive to the master pulse. This derivative protocol appends the master pulse to a beginning portion of the SENT frame. As the master pulse defined in each of the detecting sections, for example, as shown in FIG. 22, the master pulses that have the time lengths T1 and T2 of the Low-level (hereinafter referred to as "a T1 master pulse" and "a T2 master pulse") are assigned to the detecting sections 101 and 102, respectively. As well, the signal other than the Low-level signal may be used as the master pulse. Not assigning the time length, the unique number may be assigned to each of the detecting sections.

In the torque sensor IC 210, the detected values Dva and Dvb are the steering torque detected value and the SENT frames Sfa and Sfb are corresponding to the steering torques Tha1 and Thb1, respectively. In the torque sensor IC 220, the detected values Dva and Dvb are the steering torque detected value and the SENT frames Sfa and Sfb are corresponding to the steering torque Tha2 and Thb2, respectively. In the steering angle sensor IC 230, the detected values Dva and Dvb are the steering angle detected value and the SENT frames Sfa and Sfb are corresponding to the steering torque θa1 and θb1, respectively. In the steering angle sensor IC 240, the detected values Dva and Dvb are the steering angle detected value and the SENT frames Sfa and Sfb are corresponding to the steering torque θa2 and θb2, respectively.

Next, the configuration example of the ECU 300 will be described.

Figure 23:
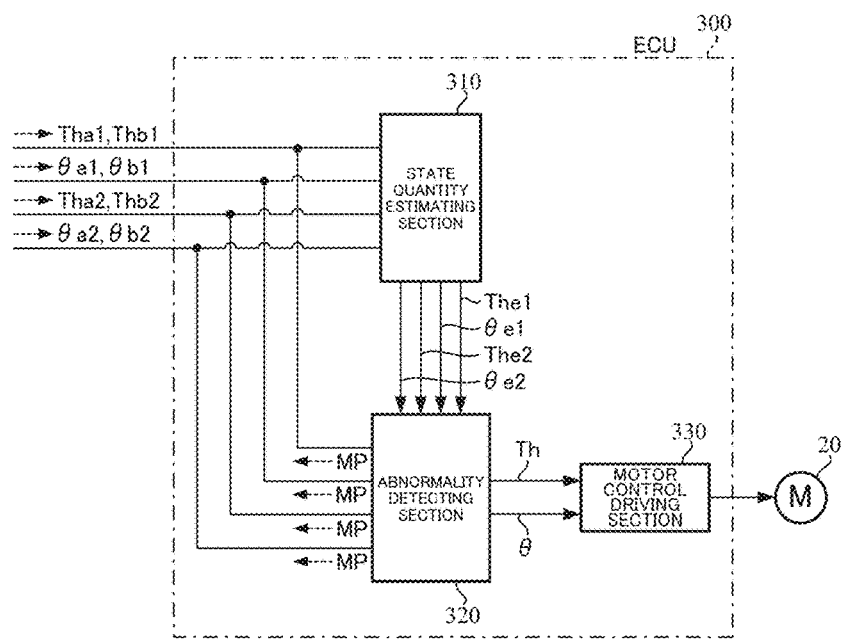
FIG. 23 is a block diagram showing a configuration example of an ECU (the fifth embodiment)

FIG. 23 shows the configuration example of the ECU 300. The ECU 300 comprises a state quantity estimating section 310, an abnormality detecting section 320 and a motor control driving section 330.

The state quantity estimating section 310 calculates an estimated value by using the detected value in the SENT frame outputted from the detector 150 through the signal line. Concretely, the state quantity estimating section 310 calculates the steering torque estimated value The1 from the steering torques Tha1 and Thb1, the steering angle estimated value θe1 from the steering angles θa1 and θb1, the steering torque estimated value The2 from the steering torques Tha2 and Thb2 and the steering angle estimated value θe2 from the steering angles θa2 and θb2.

A method for calculating the estimated value The1 from the steering torques Tha1 and Thb1 is mentioned as an example and the calculation method will be described. Correctly, although the estimated values are calculated by using the steering torque detected values stored in the steering torques Tha1 and Thb1, the steering torque detected values are simply referred to as "the steering torque" and the explanation is continued in the following explanation.

Figure 24A:
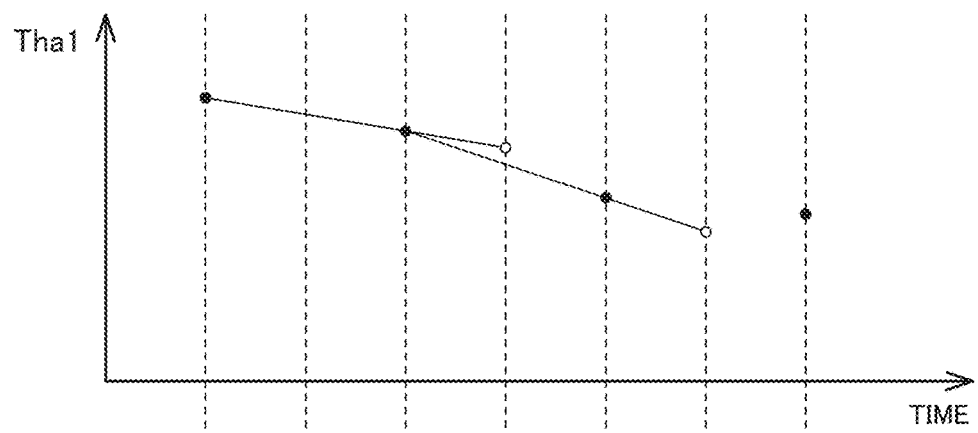
FIGS. 24A and 24B are graphs for explaining a calculation method of an estimation value.
Figure 24B:
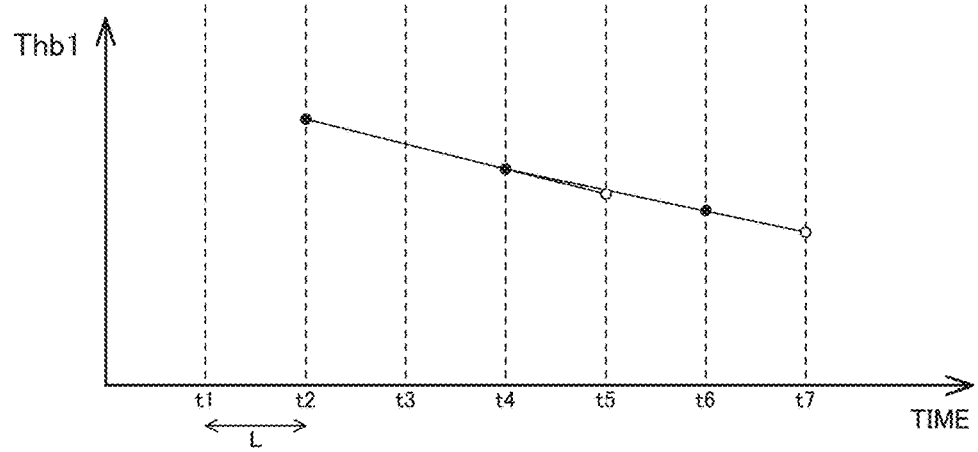

It is assumed that the steering torques Tha1 and Thb1 are alternatively acquired in a period L, and for example, as shown by black circles of FIGS. 24A and 24B, are inputted into the state quantity estimating section 310 through the signal line 11. In this case, the estimated value of the steering torque Tha1 at a time point t4, which is shown by a white circle, is calculated from the steering torque at a time point t1 Tha1 (t1) and the steering torque at a time point t3 Tha1 (t3) by using a linear approximation. That is, the estimated value of the steering torque Tha1 at the time point t4 is calculated by the following Expression 1 and is outputted as the estimated value The1 (See, FIG. 24A).

$$The1 = \frac{Tha1(t3) - Tha1(t1)}{t3 - t1} \times L + Tha1(t3) \qquad [\text{Expression 1}]$$

Similarly, the estimated value of the steering torque Tha1 at a time point t6 is calculated from the steering torque Tha1 (t3) and the steering torque Tha1 (t5) by using a linear approximation, and is outputted as the estimated value The1 (See, FIG. 24A). The estimated value of the steering torque Thb1 is similarly calculated by the above method. That is, the estimated value at the time point t5 is calculated from the steering torque Thb1 (t2) and the steering torque Thb1 (t4) and is outputted as the estimated value The1, and the estimated value at a the time point t7 is calculated from the steering torque Thb1 (t4) and the steering torque Thb1 (t6) and is outputted as the estimation value The1 (See, FIG. 24B). In such a manner, the estimated values of the steering torques Tha1 and Thb1 are alternatively outputted as the estimated value The1.

The estimated values θe1, The2 and θe2 are calculated as well as a case of the estimated value The1. As well, not using the linear approximation using the two detected values, the estimated value may be calculated by the linear approximation or the curve approximation using the three detected values or more.

The abnormality detecting section 320 detects the abnormality of the detector 150 with the abnormality detection (hereinafter referred to as "abnormality detection 1") based on the detected value in the SENT frame outputted from the detector 150 and the estimated value outputted from the state quantity estimating section 310, and with the abnormality detection (hereinafter referred to as "abnormality detection 2") using the value of the CRC session (the CRC data) in the SENT frame. As described above, since the detected value in one of the two detecting sections of the respective sensor ICs and the estimated value in the other of the two detecting sections are obtained at any time point, in a case that the magnitude (the absolute value) of the difference between the above two values is larger than a predetermined threshold in the abnormality detection 1, it is judged that the abnormality is occurred in the detector 150. On the contrary, in the abnormality detection 2, it is judged that the abnormality is occurred in a case that the CRC data is different from the expectation value. In a case that it is judged that the abnormality is occurred, if the normal operation sensor IC is existed, the detected value of this sensor IC is outputted to the motor control driving section 330. The detected value of the torque sensor IC is outputted as the steering torque Th to the motor control driving section 330, and the detected value of the steering angle sensor IC is outputted as the steering angle θ to the motor control driving section 330. In a case that it is judged that the abnormality is not occurred, one of the detected values of the two sensor ICs in the torque detecting section 160 and one of the detected values of the two sensor ICs in the steering angle detecting section 170 are outputted. As well, not outputting the detected value, the calculated value using the detected value and the estimated value, for example, an average value of the detected value and the estimated value, may be outputted.

The abnormality detecting section 320 outputs the master pulse MP to the respective sensor ICs through the signal line. The T1 master pulse and the T2 master pulse, which are shown in FIG. 22, alternatively output as the master pulse MP in the period L so that the SENT frame is alternately inputted from the detecting section 101 in the respective sensor ICs and the detecting section 102 in the respective sensor ICs.

Figure 2:
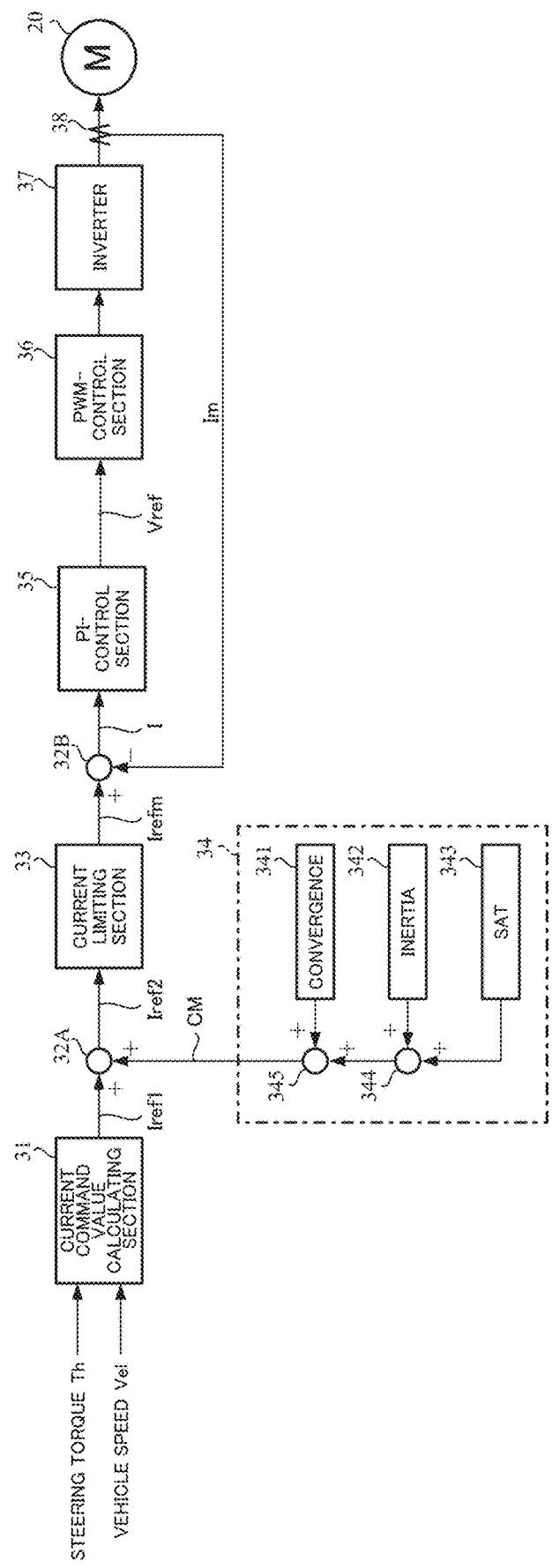
FIG. 2 is a block diagram showing a configuration example of a control system of an electric power steering apparatus.

For example, as shown in the configuration example of FIG. 2, the motor control driving section 330 comprises the current command value calculating section 31, the adding section 32A, the compensation signal generating section 34, the current limiting section 33, the subtracting section 32B, the PI-control section 35, the PWM-control section 36 and the inverter 37, and driving-controls the motor 20 based on the steering torque Th, the steering angle θ and the like, which are outputted from the abnormality detecting section 320, by the similar operation of the control system of FIG. 2.

In such a configuration, the operation example of the fifth embodiment will be described.

At first, the operation example of the detector 150 will be described. Hereinafter, the numerals of the elements of the torque sensor IC 210 are assigned to a sign "-1", the numerals of the elements of the torque sensor IC 220 are assigned to a sign "-2", the numerals of the elements of the steering angle sensor IC 230 are assigned to a sign "-3", and the numerals of the elements of the steering angle sensor IC 240 are assigned to a sign "-4". The elements of the respective sensor ICs can be distinguished by the above assignment.

In the torque detecting section 160, when the magnetic flux density that is generated depending on the positional relationship between the multipole ring magnet 61 and the sensor yokes 62a and 62b is flowed to the torque sensor ICs 210 and 220, the four detecting sections, that is, the detecting sections 101-1 and 102-1 in the torque sensor IC 210 and the detecting sections 101-2 and 102-2 in the torque sensor IC 220, detect this magnetic flux density. The detecting section 101-1 outputs the detected magnetic flux density to the communication section 203-1 as the steering torque detected value DTha1, and the detecting section 102-1 outputs the detected magnetic flux density to the communication section 204-1 as the steering torque detected value DThb1. The detecting section 101-2 outputs the detected magnetic flux density to the communication section 203-2 as the steering torque detected value DTha2, and the detecting section 102-2 outputs the detected magnetic flux density to the communication section 204-2 as the steering torque detected value DThb2.

In a case that the master pulse MP is the T1 master pulse, the communication section 203-1 stores the inputted steering torque detected value DTha1 in the SENT frame, and outputs this value as the steering torque Tha1 through the signal line 11. In a case that the master pulse MP is the T2 master pulse, the communication section 204-1 stores the inputted steering torque detected value DThb1 in the SENT frame, and outputs this value as the steering torque Thb1 through the signal line 11. In a case that the master pulse MP is the T1 master pulse, the communication section 203-2 stores the inputted steering torque detected value DTha2 in the SENT frame, and outputs this value as the steering torque Tha2 through the signal line 21. In a case that the master pulse MP is the T2 master pulse, the communication section 204-2 stores the inputted steering torque detected value DThb2 in the SENT frame, and outputs this value as the steering torque Thb2 through the signal line 21. The steering torques Tha1, Thb1, Tha2 and Thb2 are inputted into the ECU 300.

In the steering angle detecting section 170, the four detecting sections, that is, the detecting sections 101-3 and 102-3 in the steering angle sensor 230 and the detecting sections 101-4 and 102-4 in the steering angle sensor 240, detect the rotational angle (the steering angle) of the two-pole magnets due to the positional relationship between two pairs of the two-pole magnets and the steering angle sensor ICs. The detecting section 101-3 outputs the detected steering angle to the communication section 203-3 as the steering angle detected value Dθa1, and the detecting section 102-3 outputs the detected steering angle to the communication section 204-3 as the steering angle detected value Dθb1. The detecting section 101-4 outputs the detected steering angle to the communication section 203-4 as the steering angle detected value Dθa2, and the detecting section 102-4 outputs the detected steering angle to the communication section 204-4 as the steering angle detected value Dθb2.

In a case that the master pulse MP is the T1 master pulse, the communication section 203-3 stores the inputted steering angle detected value Dθa1 in the SENT frame, and outputs this value as the steering angle θa1 through the signal line 12. In a case that the master pulse MP is the T2 master pulse, the communication section 204-3 stores the inputted steering angle detected value Dθb1 in the SENT frame, and outputs this value as the steering angle θb1 through the signal line 12. In a case that the master pulse MP is the T1 master pulse, the communication section 203-4 stores the inputted steering angle detected value Dθa2 in the SENT frame, and outputs this value as the steering angle θa2 through the signal line 22. In a case that the master pulse MP is the T2 master pulse, the communication section 204-4 stores the inputted steering angle detected value Dθb2 in the SENT frame, and outputs this value as the steering angle θb2 through the signal line 22. The steering angles θa1, θb1, θa2 and θb2 are inputted into the ECU 300.

Figure 25:
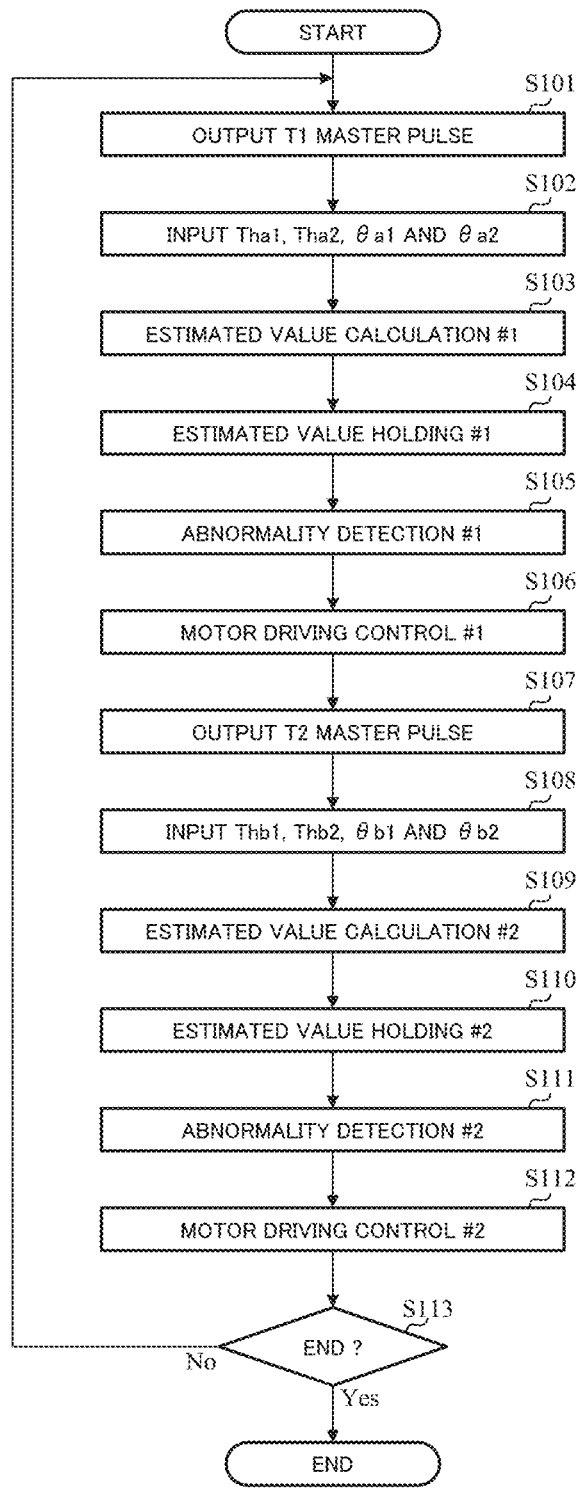
FIG. 25 is a flowchart showing an operation example of the ECU (the fifth embodiment)

Next, the operation example of the ECU 300 will be described with reference to the flowchart of FIG. 25.

In order to acquire the detected values, the abnormality detecting section 320 in the ECU 300 sets the T1 master pulse in the master pulse MP and outputs the T1 master pulse to the respective sensor ICs in the detector 150 through the signal lines (Step S101).

In response to the T1 master pulse, since the torque sensor ICs 210 and 220 respectively output the steering torques Tha1 and Tha2 and the steering angle sensor ICs 230 and 240 respectively output the steering angle θa1 and θa2, the outputted values Tha1, Tha2, θa1 and θa2 are inputted into the state quantity estimating section 310 and the abnormality detecting section 320 (Step S102).

The state quantity estimating section 310 calculates the estimated values The1, The2, θe1 and θe2 by using the inputted values Tha1, Tha2, θa1 and θa2 and the past values of the values Tha1, Tha2, θa1 and θa2 in accordance with the Expression 1 (Step S103). Since these estimated values are used for the calculation in the next period, these estimated values are held until the next period (Step S104).

By using the inputted values Tha1, Tha2, θa1 and θa2 and the estimated values which are calculated in the preceding period and are held in the state quantity estimating section 310, the abnormality detecting section 320 performs the abnormality detection with the abnormality detection method and the accuracy verification method of the detected value as described below (Step S105). In a case that the steering torque Th and the steering angle θ are obtained, these values are outputted to the motor control driving section 330. The motor control driving section 330 driving-controls the motor 20 based on the steering torque Th, the steering angle θ and the like (Step S106).

Next, the abnormality detecting section 320 sets the T2 master pulse in the master pulse MP and outputs the T2 master pulse to the respective sensor ICs in the detector 150 through the signal lines (Step S107).

In response to the T2 master pulse, since the torque sensor ICs 210 and 220 respectively output the steering torques Thb1 and Thb2 and the steering angle sensor ICs 230 and 240 respectively output the steering angle θb1 and θb2, the outputted values Thb1, Thb2, θb1 and θb2 are inputted into the state quantity estimating section 310 and the abnormality detecting section 320 (Step S108).

The state quantity estimating section 310 calculates the estimated value The1, The2, θe1 and θe2 by using the inputted values Thb1, Thb2, θb1 and θb2 and the past values of the values Thb1, Thb2, θb1 and θb2 in accordance with the Expression 1 (Step S109). Since these estimated values are used for the calculation in the next period, these estimated values are held until the next period (Step S110).

By using the inputted values Thb1, Thb2, θb1 and θb2 and the estimated values which are held in the state quantity estimating section 310 at the Step S104, the abnormality detecting section 320 performs the abnormality detection similar to the Step S105 (Step S111). In similar to the Step S106, the motor control driving section 330 driving-controls the motor 20 (Step S112).

The above operation (Steps S101 to S112) is iterated until the operation is ended (Step S113). As well, the order of the operation of the state quantity estimating section 310 and the operation of the abnormality detecting section 320 may be changed, or the operation of the state quantity estimating section 310 and the operation of the abnormality detecting section 320 may be performed in parallel.

The abnormality detection method and the accuracy verification method of the detected value in the abnormality detecting section 320 will be described with respect to the abnormality occurrence portions. As well, the operation in a case that the steering torques Tha1 and Tha2 and the steering angles θa1 and θa2 are inputted is similar to the operation in a case that the steering torques Thb1 and Thb2 and the steering angles θb1 and θb2 are inputted. Thus, hereinafter, the steering torques Tha1 and Tha2 and the steering torques Thb1 and Thb2 are collectively referred to as "the steering torques TH1 and TH2". The steering angles θa1 and θa2 and the steering angles θb1 and θb2 are collectively referred to as "the steering angles θ_1 and θ_2". The collective terms are also used for the steering torque detected value in the steering torque and the steering angle detected value in the steering angle.

Figure 26:
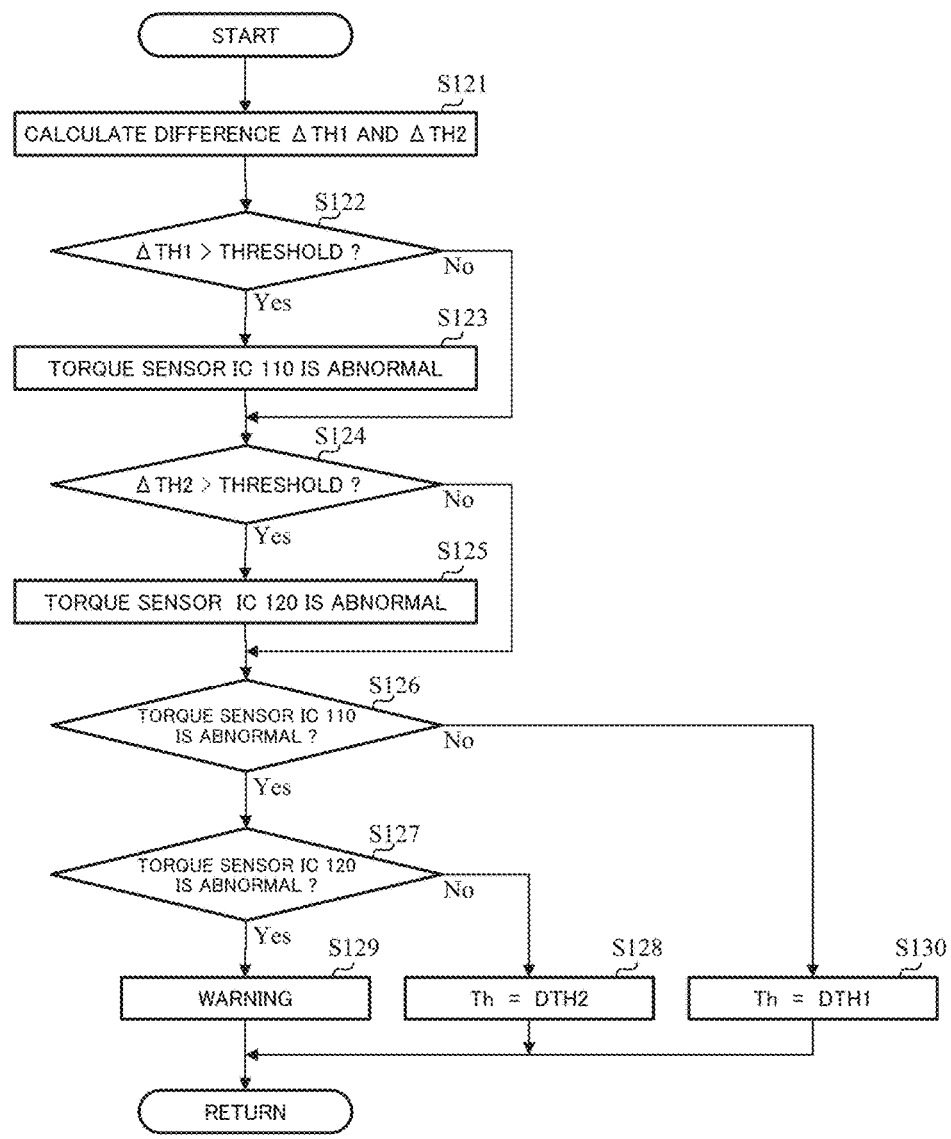
FIG. 26 is a flowchart showing an operation example of an abnormality detecting section (the fifth embodiment) in a case that abnormality is occurred in the torque sensor IC.

At first, a case that the abnormality is occurred in the torque sensor IC will be described with reference to the flowchart of FIG. 26. as well, when normally operating, it is assumed that the abnormality detecting section 320 outputs the steering torque detected value DTH1 in the steering torque TH1, which are outputted from the torque sensor IC 210, as the steering torque Th.

The abnormality detecting section 320 calculates the difference ΔTH1 (=DTH1−The1) between the steering torque detected value DTH1 and the estimated value The1 in the inputted steering torque TH1 and the difference DTH2 (=DTH2−The2) between the steering torque detected value DTH2 and the estimated value The2 (Step S121), and compares the differences ΔTH1 and ΔTH2 with a predetermined threshold FXT. In a case that the abnormality is occurred in the torque sensor IC, since the magnitude of the difference in the steering torque that is outputted from the torque sensor IC in which the abnormality is occurred is larger than the threshold FXT, the abnormality can be detected. In a case that the difference ΔTH1 (the absolute value) is larger than the threshold FXT (Step S122), it is judged that the abnormality is occurred in the torque sensor IC 210 (Step S123). In a case that the magnitude of the difference ΔTH2 (the absolute value) is larger than the threshold FXT (Step S124), it is judged that the abnormality is occurred in the torque sensor IC 220 (Step S125). In a case that the magnitude of the difference is not larger than the threshold FXT, it is judged that the abnormality is not occurred and the steering torque detected value has a sufficient accuracy. Therefore, in a case that it is judged that the abnormality is occurred in the torque sensor IC 210 (Step S126), when the abnormality is not occurred in the torque sensor IC 220 (Step S127), it is judged that the steering torque detected value DTH2 has the sufficient accuracy. The steering torque detected value DTH2 is outputted as the steering torque Th (Step S128). When the abnormality is also occurred in the torque sensor IC 220 (Step S127), it is judged that the abnormality is occurred in both the torque sensor ICs 210 and 220, and the warning is issued (Step S129). In a case that it is judged that the abnormality is not occurred in the torque sensor IC 210 (Step S126), the steering torque detected value DTH1 is continuously outputted as the steering torque Th (Step S130).

Besides, although the comparison is performed by using the same threshold FXT for the differences ΔTH1 and ΔTH2, the different thresholds may be used in the comparison.

Figure 27:
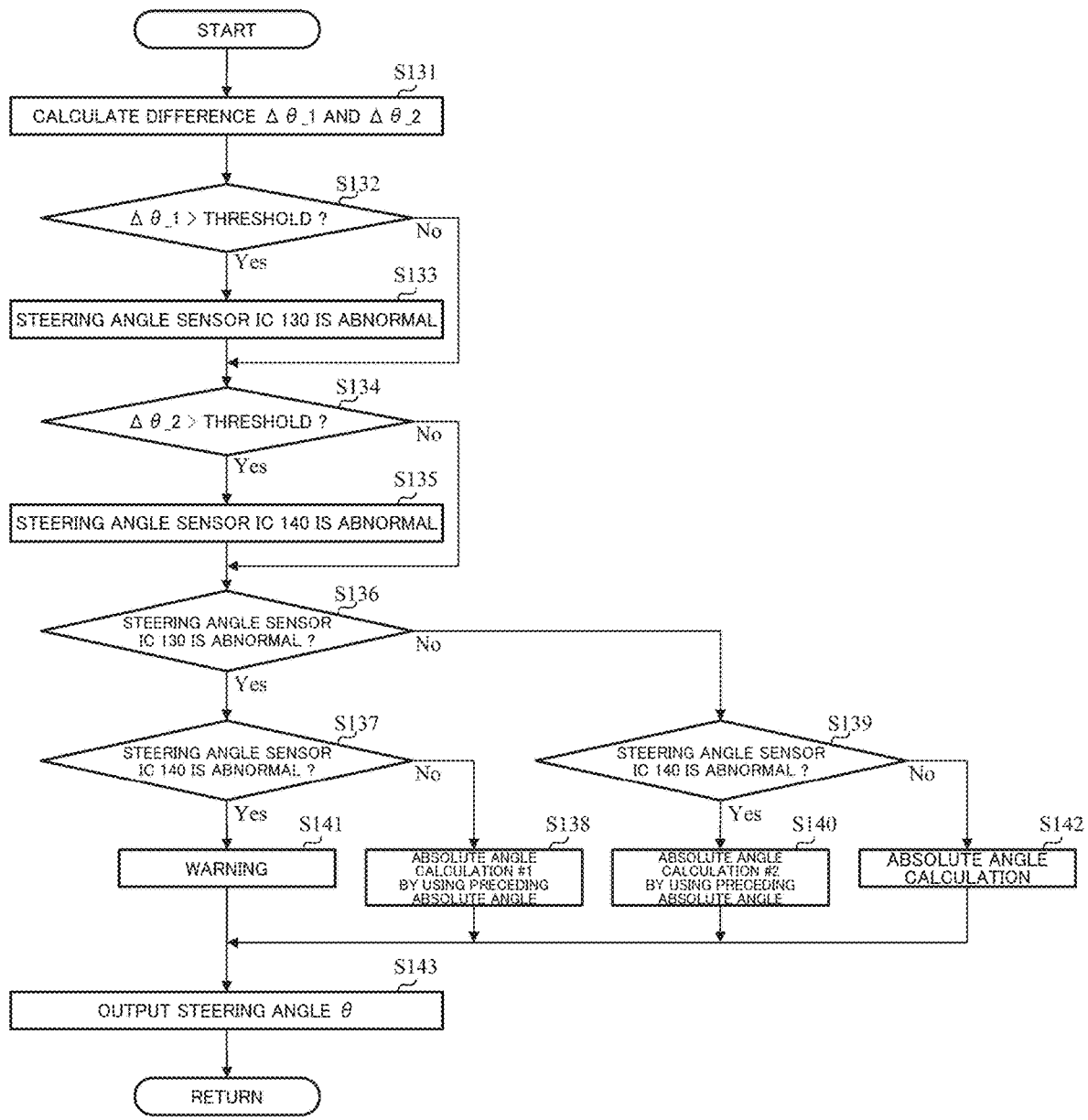
FIG. 27 is a flowchart showing an operation example of the abnormality detecting section (the fifth embodiment) in a case that the abnormality is occurred in the steering angle sensor IC.

Next, a case that the abnormality is occurred in the steering angle sensor IC will be described with reference to the flowchart of FIG. 27. When normally operating, the abnormality detecting section 320 calculates the absolute angle with the steering angle detected value Dθ_1 in the steering angle θ_1 outputted from the steering angle IC 230 and the steering angle detected value Dθ_2 in the steering angle θ_2 outputted from the steering angle IC 240 (Step S142).

The abnormality detecting section 320 calculates the difference Δθ_1 (=Dθ_1−θe1) between the steering angle detected value Dθ_1 in the inputted steering angle θ_1 and the estimated value θe1 and the difference Δθ_2 (=Dθ_2−θe2) between the steering angle detected value Dθ_2 in the inputted steering angle θ_2 and the estimated value θe2 (Step S131), and compares the differences Δθ_1 and Δθ_2 with a predetermined threshold FXA. In a case that the abnormality is occurred in the steering angle sensor IC, since the magnitude of the difference to the steering angle that is outputted from the steering angle sensor IC in which the abnormality is occurred is larger than the threshold FXA, the abnormality can be detected. In a case that the difference Δθ_1 (the absolute value) is larger than the threshold FXA (Step S132), it is judged that the abnormality is occurred in the steering angle sensor IC 230 (Step S133). In a case that the difference Δθ_2 (the absolute value) is larger than the threshold FXA (Step S134), it is judged that the abnormality is occurred in the steering angle sensor IC 240 (Step S135). In a case that the magnitude of the difference is not larger than the threshold FXA, it is judged that the abnormality is not occurred and the steering angle detected value has a sufficient accuracy.

However, in a case that it is judged that the abnormality is occurred in one of the steering angle sensor ICs, even when it is judged that the steering angle detected value from the other of the steering angle sensor ICs has the sufficient accuracy, the absolute angle cannot be directly calculated from the above steering angle detected value. Thus, the absolute angle is calculated based on the absolute angle information just before the abnormality is occurred. That is, the abnormality detecting section 320 holds the steering angle θ_1 inputted from the steering angle sensor IC 230, the steering angle θ_2 inputted from the steering angle sensor IC 240 and the absolute angle calculated from the steering angle θ_1 and the steering angle θ_2 until the subsequent steering angles θ_1 and θ_2 are inputted. In a case that it is judged that the abnormality is occurred in the steering angle sensor IC 230 (Step S136) and the abnormality is not occurred in the steering angle sensor IC 240 (Step S137), the absolute angle after the abnormality occurrence is calculated by adding the difference between the steering angle detected value Dθ_2 in the inputted steering angle θ_2 and the steering angle detected value Dθ_2 in the preceding steering angle θ_2 to the preceding absolute angle (Step S138). In a case that it is judged that the abnormality is not occurred in the steering angle sensor IC 230 (Step S136) and the abnormality is occurred in the steering angle sensor IC 240 (Step S139), the absolute angle after the abnormality occurrence is calculated by adding the difference between the steering angle detected value Dθ_1 in the inputted steering angle θ_1 and the steering angle detected value Dθ_1 in the preceding steering angle θ_1 to the preceding absolute angle (Step S140). When the abnormality is occurred in both the steering angle sensor ICs 230 and 240, the warning is issued (Step S141). The calculated absolute angle is outputted as the steering angle θ (Step S143).

As well, although the comparison is performed by using the same threshold FXA for the differences Δθ_1 and Δθ_2, the different thresholds may be used in the comparison.

Figure 28:
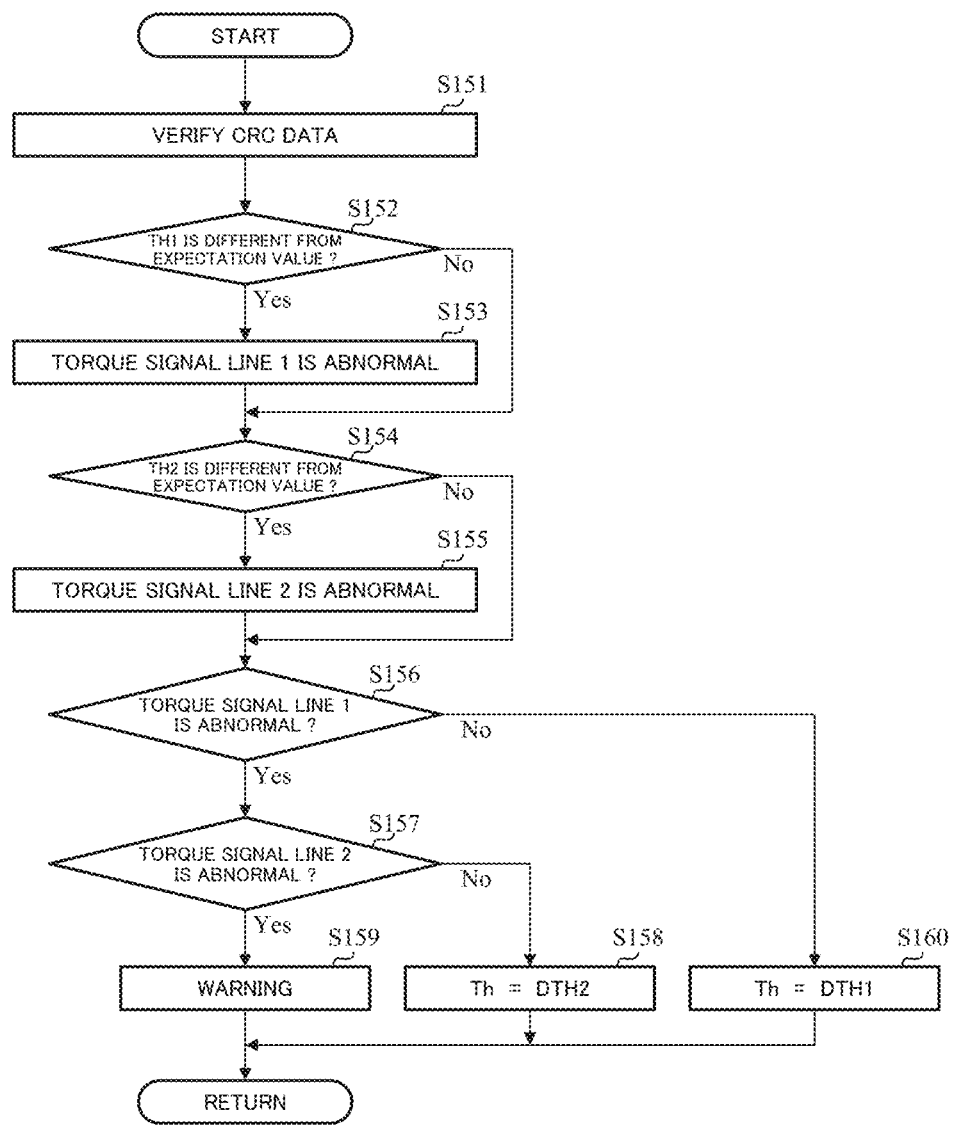
FIG. 28 is a flowchart showing an operation example of the abnormality detecting section (the fifth embodiment) in a case that the abnormality is occurred in the torque signal line.

Next, a case that the abnormality is occurred in the signal line (the torque signal line) that transmits the steering torque (the signal) by connecting the torque sensor IC and the ECU 300 each other will be described with reference to the flowchart of FIG. 28. When normally operating, it is assumed that the abnormality detecting section 320 outputs the steering torque detected value DTH1 in the steering torque TH1, which is outputted from the torque sensor IC 210, as the steering torque Th.

By using the CRC data in the respective SENT frames of the steering torques TH1 and TH2, the abnormality detecting section 320 verifies whether the abnormality is occurred or not. In a case that the abnormality is occurred in the torque signal line, since the CRC data is different from the expectation value, the abnormality can be detected. The abnormality detecting section 320 verifies the respective CRC data of the steering torques TH1 and TH2 (Step S151). In a case that the CRC data in the SENT frame of the steering torque TH1 is different from the expectation value (Step S152), the abnormality detecting section 320 judges that the abnormality is occurred in the torque signal line (the torque signal line 1) between the torque sensor IC 210 and the ECU 300 (Step S153). In a case that the CRC data in the SENT frame of the steering torque TH2 is different from the expectation value (Step S154), the abnormality detecting section 320 judges that the abnormality is occurred in the torque signal line (the torque signal line 2) between the torque sensor IC 220 and the ECU 300 (Step S155). In a case that the CRC data is the expectation value, it is judged that the abnormality is not occurred in the torque signal line. In a case that it is judged that the abnormality is occurred in the torque signal line 1 (Step S156), when the abnormality is not occurred in the torque signal line 2 (Step S157), the steering torque detected value DTH2 in the steering torque TH2 is outputted as the steering torque Th (Step S158). When the abnormality is also occurred in the torque signal line 2 (Step S157), the warning is issued (Step S159). In a case that it is judged that the abnormality is not occurred in the torque signal line 1 (Step S156), the steering torque detected value DTH1 is outputted as the steering torque Th (Step S160).

Figure 29:
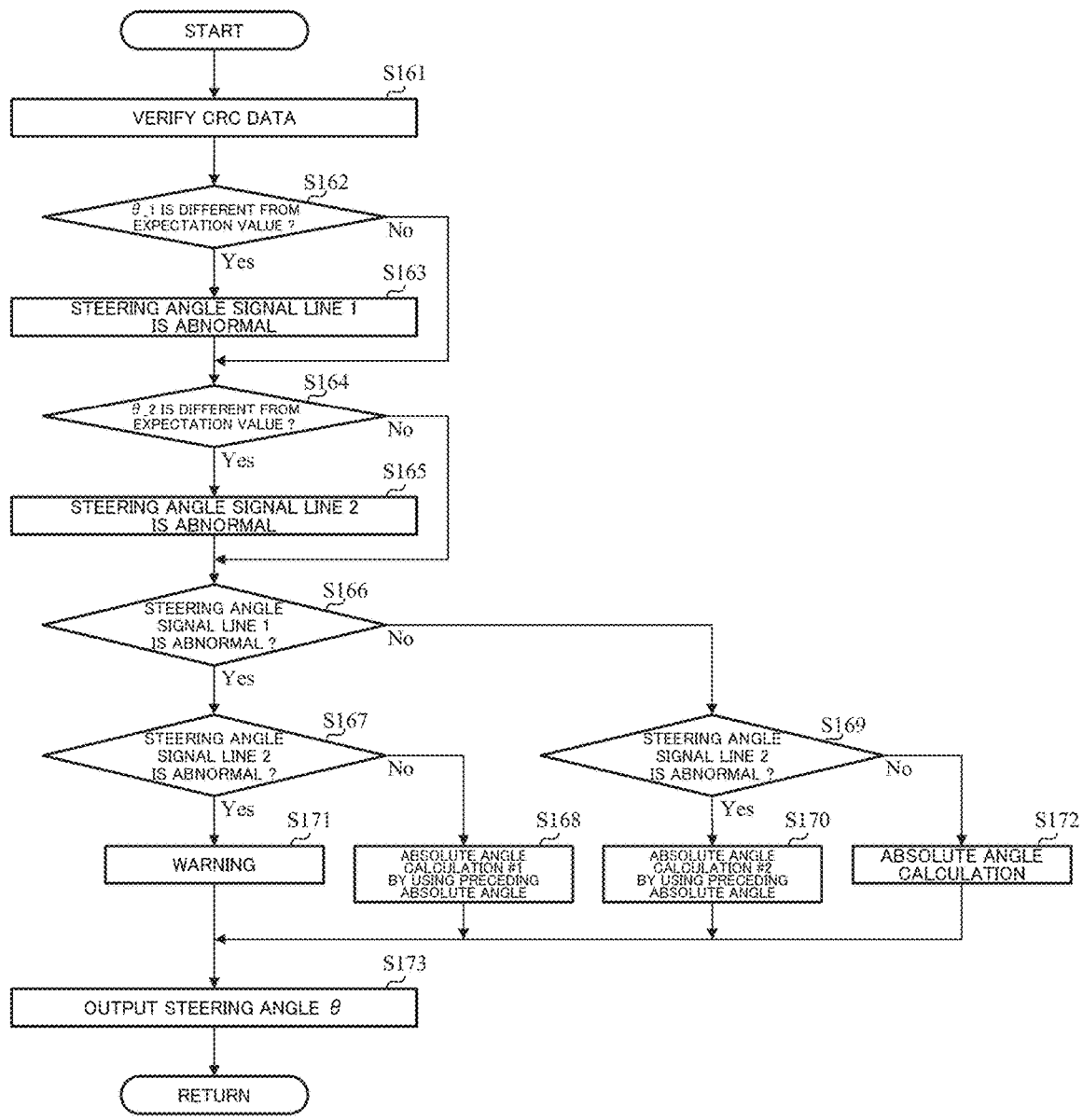
FIG. 29 is a flowchart showing an operation example of the abnormality detecting section (the fifth embodiment) in a case that the abnormality is occurred in the steering angle signal line.

Next, a case that the abnormality is occurred in the signal line (the steering angle signal line) that transmits the steering angle (the signal) by connecting the steering angle sensor IC and the ECU 300 each other will be described with reference to the flowchart of FIG. 29. The abnormality detecting section 320 calculates the absolute angle with the steering angle detected value Dθ_1 in the steering angle θ_1 outputted from the steering angle sensor IC 230 and the steering angle detected value Dθ_2 in the steering angle θ_2 outputted from the steering angle sensor IC 240 (Step S172).

In this case, as well as a case of the torque signal line, by using the CRC data in the respective SENT frames of the steering angles θ_1 and θ_2, the abnormality detecting section 320 verifies whether the abnormality is occurred or not. In a case that the abnormality is occurred in the steering angle signal line, since the CRC data is different from the expectation value, the abnormality can be detected. The abnormality detecting section 320 verifies the respective CRC data of the steering angles θ_1 and θ_2 (Step S161). In a case that the CRC data in the SENT frame of the steering angle θ_1 is different from the expectation value (Step S162), the abnormality detecting section 320 judges that the abnormality is occurred in the steering angle signal line (the steering angle signal line 1) between the steering angle sensor IC 230 and the ECU 300 (Step S163). In a case that the CRC data in the SENT frame of the steering angle θ_2 is different from the expectation value (Step S164), the abnormality detecting section 320 judges that the abnormality is occurred in the steering angle signal line (the signal line 2) between the steering angle sensor IC 240 and the ECU 300 (Step S165). In a case that the CRC data is the expectation value, it is judged that the abnormality is not occurred in the steering angle signal line. In a case that it is judged that the abnormality is occurred in one of the steering angle signal lines, even when it is judged that the abnormality is not occurred in the other of the steering angle signal lines, the absolute angle cannot be directly calculated from the other of the steering angle signal lines. As well as a case that the abnormality is occurred in the steering angle sensor IC, the absolute angle is calculated based on the absolute angle information just before the abnormality is occurred. That is, in a case that it is judged that the abnormality is occurred in the steering angle signal line 1 (Step S166) and the abnormality is not occurred in the steering angle signal line 2 (Step S167), the absolute angle after the abnormality occurrence is calculated by adding the difference between the steering angle detected value Dθ_2 in the inputted steering angle θ_2 and the steering angle detected value Dθ2 in the preceding steering angle θ_2 to the preceding absolute angle (Step S168). In a case that the abnormality is not occurred in the steering angle signal line 1 (Step S166) and the abnormality is occurred in the steering angle signal line 2 (Step S169), the absolute angle after the abnormality occurrence is calculated by adding the difference between the steering angle detected value Dθ_1 in the inputted steering angle θ_1 and the steering angle detected value Dθ_1 in the preceding steering angle θ_1 to the preceding absolute angle (Step S170). In a case that it is judged that the abnormality is occurred in both the steering angle signal line 1 and the steering angle signal line 2, the warning is issued (Step S171). The calculated absolute angle is outputted as the steering angle θ (Step S173). Thus, the abnormality due to the external disturbance noise is detectable.

Finally, a case that the abnormality is occurred in the electric supply lines for the power supply 1 and the power supply 2 (the electric supply line 1 and the electric supply line 2) and the ground lines for the GND 1 and the GND 2 (the ground line 1 and the ground line 2), which are connected to the respective sensor ICs, will be described.

In a case that the abnormality is occurred in the wiring (the electric supply line or the ground line), since the power supply voltage supplied to the sensor IC, which is connected to the wiring in which the abnormality is occurred, is out of a normal operating range, the abnormality is detectable by a pseudo comparison match between the steering torque detected value in the steering torques from the respective sensor ICs and the estimated value and/or the pseudo comparison match between the steering angle detected value in the steering angles and the estimated value, or the CRC data check in the SENT frame of the steering torque and/or the steering angle. For example, in a case that the inconsistency is verified in the pseudo comparison match between the steering torque detected value DTH1 and the estimated value The1 and/or the pseudo comparison match between the steering angle detected value Dθ_1 and the estimated value θe1, or in a case that the CRC data in the SENT frame of the steering torque TH1 and/or the steering angle θ_1 is different from the expectation value, it can be judged that the abnormality is occurred in the electric supply line 1 and/or the ground line 1. In a case that there is no problem in the pseudo comparison matches to the steering torque detected value and the steering angle detected value, and the CRC data check in the SENT frame of the steering torque and the steering angle, it is judged that the steering torque detected value and the steering angle detected value have a sufficient accuracy. Thus, for example, in a case that it is judged that the abnormality is occurred in the electric supply line 1 and/or the ground line 1, if there is no problem in the respective results of the pseudo comparison match between the steering torque detected value DTH2 and the estimated value The2, the pseudo comparison match between the steering angle detected value Dθ_2 and the estimated value θe2, and the CRC data check in the SENT frame of the steering torque TH2 and the steering angle θ_2, it is judged that the steering torque detected value DTH2 and the steering angle detected value Dθ_2 have a sufficient accuracy. The steering torque detected value DTH2 is outputted as the steering torque Th. By using the same method in a case that the abnormality is occurred in the steering angle sensor IC or the steering angle signal line, the absolute angle is calculated based on the steering angle detected value Dθ_2 and the absolute angle information just before the abnormality occurrence. The calculated absolute angle is outputted as the steering angle θ. Even in a case that it is judged that the abnormality is occurred in the electric supply line 2 and/or the ground line 2, the steering torque Th and the steering angle θt are outputted by using the similar method.

As well as the detecting apparatus 50 in the first embodiment, the detector 150 comprises the two torque sensor ICs and the two steering angle sensor ICs, and the respective sensor ICs comprise the two detecting sections. Further, since the two communication sections output the steering torque and the steering angle to the ECU 300 by the SENT communication, the ECU 300 can judge the abnormality occurrence in the sensor ICs and the wirings. In a case that the abnormality is occurred in one of the systems, the operation can be continued by using the other system.

As well as a case of the first embodiment, in the fifth embodiment, the communication section may use the signal protocol other than the SENT communication, which has an error detection function.

Figure 30:
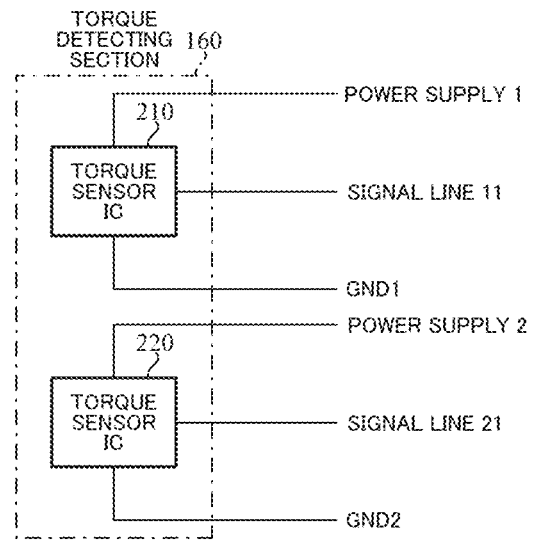
FIG. 30 is a block diagram showing a configuration example around the sensor ICs (the sixth embodiment)
Figure 31:
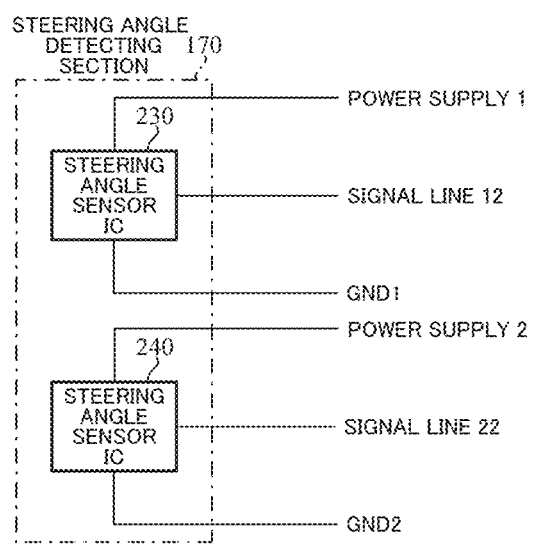
FIG. 31 is a block diagram showing a configuration example around the sensor ICs (the seventh embodiment)

As well as the second and third embodiments, the detector may be constituted by only the torque detecting section 60 or only the steering angle detecting section 70. The configuration example that is constituted by only the torque detecting section 60 (the sixth embodiment) and the configuration example that is constituted by only the steering angle detecting section 70 (the seventh embodiment) are shown in FIGS. 30 and 31, respectively.

Figure 32:
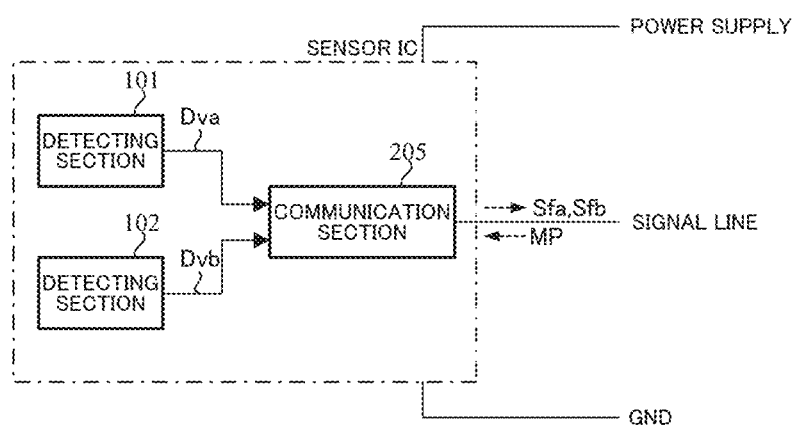
FIG. 32 is a block diagram showing a configuration example of the sensor IC (the eighth embodiment).

Further, two communication sections are provided in the respective sensor ICs in the fifth embodiment. Two communication sections are integrated into one communication section and each of the sensor ICs may comprises one communication section. The configuration example of the sensor ICs that comprise only one communication section (the eighth embodiment) is shown in FIG. 32. In the eighth embodiment, the detected value Dva outputted from the detecting section 101 and the detected value Dvb outputted from the detecting section 102 are inputted into the communication section 205. In a case that the master pulse MP is the T1 master pulse, the communication section 205 inputs the detected value Dva from the detecting section 101. In a case that the master pulse MP is the T2 master pulse, the communication section 205 inputs the detected value Dvb from the detecting section 102. The communication section 205 outputs the detected values Dva and Dvb as the SENT frames Sfa and Sfb, respectively. By employing the above configuration, space saving can be achieved. In a case that the abnormality detection 2 is not performed and the abnormality of the detector 150 is detected by only the abnormality detection 1, the communication section may be removed. Thereby, more space saving can be achieved. In this case, the judgement of the detected value output by the master pulse is performed by the detecting section.

In the fifth to eighth embodiments, the individual signal lines corresponding to the respective sensor ICs are connected to the ECU 300. (The torque sensor IC 210 uses the signal line 11. The torque sensor IC 220 uses the signal line 21. The steering angle sensor IC 230 uses the signal line 12. The steering angle sensor IC 240 uses the signal line 22.) Some of the above signal lines or all of the above signal lines are summarized into one signal line. Thereby, the number of the signal lines can be reduced. In this case, it is necessary to distinguish the master pulse among not only the detecting sections but also the sensor ICs in which the same signal line is used.

In the above embodiments (the first to eighth embodiments), the torque detecting section and the steering angle detecting section comprise two sensor ICs, and the respective sensor ICs comprise two detection sections. The torque detecting section and the steering angle detecting section may comprise three sensor ICs or more, and the respective sensor ICs comprise three detecting sections or more. Thereby, backup function can be enhanced.

EXPLANATION OF REFERENCE NUMERALS

1 handle (steering wheel)
2 column shaft (steering shaft, handle shaft)
9 torsion bar
10 torque sensor
12 vehicle speed sensor 13 battery
14 steering angle sensor
20 motor
30, 200, 300 control unit (ECU)
31 current command value calculating section
33 current limiting section
34 compensation signal generating section
35 PI-control section
36 PWM-control section
37 inverter
50 detecting apparatus
60, 160 torque detecting section
61 multipole ring magnet
62a, 62b sensor yoke
63a, 63b magnetism collecting yoke
70, 170 steering angle detecting section
71 main gear
72a, 72b driven gear
73a two-pole magnet
101, 102 detecting section
103, 104, 105, 203, 204, 205 communication section
110, 120, 210, 220 torque sensor IC
130, 140, 230, 240 steering angle sensor IC
150 detector
310 state quantity estimating section
320 abnormality detecting section
330 motor control driving section

The invention claimed is:

1. An electric power steering apparatus that is equipped with a detector that has plural sensor sections including plural detecting sections that detecting objects and state quantities to detect are same, and detects at least one of said state quantities in at least two of said sensor sections, comprising:
a control section to perform a driving-control of a motor based on said state quantities; and
at least one signal line to connect said sensor sections with said control section,
wherein said plural detecting sections in said sensor sections output said state quantities to said control section through same said signal line,
wherein said control section comprises:
a state quantity estimating section to estimate a state quantity at any time from said state quantities and to output said state quantity as an estimated state quantity; and
an abnormality detecting section to detect abnormality of said detector by using an abnormality detection based on said state quantities and said estimated state quantity,
wherein said control section outputs a selection information that is used in selecting said detecting sections outputting said state quantity through said signal line,
wherein said detecting sections corresponding to said selection information output said state quantity, and
wherein said selection information are signals having a predetermined level, said signals having said predetermined level and having a different time length are assigned to each of said detecting sections and selection of said detecting sections outputting said state quantity is performed based on said time length.

2. The electric power steering apparatus according to claim 1,
wherein said sensor section includes a communication section to output said state quantity as an error detectable signal, and
wherein said abnormality detecting section performs an abnormality detection based on said error detectable signal, and detects abnormality of said detector.

3. The electric power steering apparatus according to claim 2,
wherein said communication section generates said error detectable signal by using a single edge nibble transmission method (a SENT method).

4. The electric power steering apparatus according to claim 1,
wherein said state quantity estimating section calculates said estimated state quantities by using plural past values of said state quantities.

5. The electric power steering apparatus according to claim 1,
wherein said control section continues a driving-control of said motor based on said state quantity in a case that said abnormality of said detector is detected.

6. The electric power steering apparatus according to claim 1,
wherein an angle information is existed as one of said state quantities, and
wherein said control section calculates absolute angles of angle information by using plural angle information respectively detected by said plural sensor sections, in a case that said abnormality of said detecting apparatus is not detected, and calculates said absolute angles after said abnormality is detected, by using said angle information and said absolute angles just before said abnormality is detected, in a case that said abnormality of said detecting apparatus is detected.

* * * * *